US008964833B2

(12) United States Patent
Auwera et al.

(10) Patent No.: US 8,964,833 B2
(45) Date of Patent: Feb. 24, 2015

(54) DEBLOCKING OF NON-SQUARE BLOCKS FOR VIDEO CODING

(75) Inventors: Geert Van der Auwera, San Diego, CA (US); Marta Karczewicz, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 394 days.

(21) Appl. No.: 13/482,560

(22) Filed: May 29, 2012

(65) Prior Publication Data

US 2013/0022107 A1 Jan. 24, 2013

Related U.S. Application Data

(60) Provisional application No. 61/509,489, filed on Jul. 19, 2011, provisional application No. 61/524,491, filed on Aug. 17, 2011, provisional application No. 61/534,284, filed on Sep. 13, 2011, provisional application No. 61/555,388, filed on Nov. 3, 2011.

(51) Int. Cl.
*H04N 7/12* (2006.01)
*H04N 11/02* (2006.01)
*H04N 11/04* (2006.01)
(Continued)

(52) U.S. Cl.
CPC ..... *H04N 19/00133* (2013.01); *H04N 7/26117* (2013.01); *H04N 7/26212* (2013.01); *H04N 7/26207* (2013.01); *H04N 19/00278* (2013.01); *H04N 19/00066* (2013.01); *H04N 19/00212* (2013.01); *H04N 19/00218* (2013.01); *H04N 19/00896* (2013.01)
USPC ............ 375/240.03; 375/240.24; 375/240.16; 375/240.02; 375/E07.138

(58) Field of Classification Search
None
See application file for complete search history.

(56) References Cited

U.S. PATENT DOCUMENTS 7,995,849 B2  8/2011  Raveendran et al.
2006/0146941 A1  7/2006  Cha et al.
(Continued)

FOREIGN PATENT DOCUMENTS

WO  WO2009126299 A1  10/2009
WO  WO2010051846 A1  5/2010

OTHER PUBLICATIONS

Bross et al., "WD5: Working Draft 5 of High-Efficiency Video Coding," Joint Collaborative Team on Video Coding, JCTVC-G1103_d6, Nov. 21-30, 2011, 214 pp.
(Continued)

*Primary Examiner* — Dave Czekaj
*Assistant Examiner* — Nam Pham
(74) *Attorney, Agent, or Firm* — Shumaker & Sieffert, P.A.

(57) ABSTRACT

In one example, a video coding device is configured to decode a first block of video data and a second block of video data, wherein the first block and the second block share a common edge, and determine whether to deblock the common edge between the first block and the second block based at least in part on whether at least one of the first block and the second block is non-square. Non-square blocks of video data may comprise, for example, partitions (e.g., prediction units or transform units) resulting from asymmetric motion partitioning, non-square transforms for symmetric motion partitioning, or other quadtree transform splitting procedures. The video coding device may apply adapted deblocking decision functions and/or adapted deblocking filters to the common edge when either or both of the blocks is non-square.

52 Claims, 11 Drawing Sheets

(51) Int. Cl.
*H04N 19/134* (2014.01)
*H04N 19/159* (2014.01)
*H04N 19/157* (2014.01)
*H04N 19/176* (2014.01)
*H04N 19/117* (2014.01)
*H04N 19/82* (2014.01)

(56) References Cited

U.S. PATENT DOCUMENTS

| | | | |
|---|---|---|---|
| 2008/0123750 | A1 | 5/2008 | Bronstein et al. |
| 2008/0304569 | A1 | 12/2008 | Lee et al. |
| 2009/0077143 | A1* | 3/2009 | Macy, Jr. .................. 708/201 |
| 2009/0196342 | A1 | 8/2009 | Divorra Escoda et al. |
| 2011/0110427 | A1 | 5/2011 | Teng et al. |

OTHER PUBLICATIONS

Cao et al., "CE6.b1 Report on Short Distance Intra Prediction Method," Joint Collaborative Team on Video Coding, JCTVC-E278, May 19, 2011, 7 pp.

Cao et al: "CE6.b1 Report on Short Distance Intra Prediction Method", Joint Collaborative Team on Video Coding, JCTVC-E278, Mar. 10, 2011, 5 pp.

Cao et al., "CE6.b Report on Short Distance Intra Prediction Method," Joint Collaborative Team on Video Coding, JCTVC-E278 PowerPoint, Mar. 6, 2012, 16 pp.

Chiou, et al., "Performance Improvement of Distributed Video Coding by Using Block Mode Selection," Proceedings of the International Conference on Multimedia, ACM, Oct. 2010, 4 pp.

Francois et al., " Core Experiment 2: Flexible Motion Partitioning", Joint Collaborative Team on Video Coding, JCTVC-0502, Oct. 7-15, 2010, 6 pp.

International Search Report and Written Opinion—PCT/US2012/039989—ISA/EPO—Jul. 18, 2012 —15 pp.

International Telecommunication Union, "Advanced video coding for generic audiovisual services," Telecommunications Standardization Sector, H.264, Mar. 2010, 669 pp.

Kim et al., "CE2: Test results of asymmetric motion partition (AMP)" Joint Collaborative Team on Video Coding, JCTVC-F379, Feb. 22, 2012, 10 pp.

Kim et al.,"CE2: Test result of asymmetric motion partition (AMP)", Joint Collaborative Team on Video Coding, JCTVC-F379, Jul. 2, 2011, 8 pp.

Lai et al., "New intra prediction using the correlation between pixels and lines", Huawei Technologies Co., Ltd., Apr. 20, 2010, 10 pp.

Peterfreund et al., "Text Modifications to MB-AFF quantization and MB-AFF interaction with deblocking filter", Joint Video Team, JVT-E162, Oct. 9-17, 2002, 224 pp.

Norkin et al., "Description of CE12: deblocking filtering", Joint Collaborative Team on Video Coding, JCTVC-F912, Jul. 14-22, 2011, 15 pp.

Shi et al., "CE12, Subset 1: Report of Deblocking for Large Size Blocks", Joint Collaborative Team on Video Coding, JCTVC-F198, Jul. 14-22, 2011, 7 pp.

U.S. Appl. No. 13/466,831, by Geert Van der Auwera, filed May 8, 2012.

Van Der Auwera et al., "CE12 Subtest1: Deblocking of New Non-Square Blocks: Edge Shift for AMP", Joint Collaborative Team on Video Coding, JCTVC-G383, Nov. 21-30, 2011, 4 pp.

Van Der Auwera et al., "CE6.b: Report on SDIP Harmonization with Deblocking, MDIS, MDCS, and HE Residual Coding", Joint Collaborative Team on Video Coding, JCTVC-F556, Jul. 14-22, 2011, 15 pp.

Wiegand et al., "WD2: Working Draft 2 of High-Efficiency Video Coding," Joint Collaborative Team on Video Coding, JCTVC-D503, Jan. 20-28, 2011, 153 pp.

Wiegand et al., "WD3: Working Draft 3 of High-Efficiency Video Coding," Joint Collaborative Team on Video Coding, JCTVC-E603, Mar. 16-23, 2011, 193 pp.

Yuan Yuan et al., "CE2: Non-Square Quadtree Transform for symmetric and asymmetric motion partition," Joint Collaborative Team on Video Coding, JCTVC-F410, Feb. 22, 2012, 6 pp.

Yuan Yuan et al., "CE2: Non-Square Quadtree Transform for symmetric motion partition", Joint Collaborative Team on Video Coding, JCTVC-F410, Jul. 2, 2011, 6 pp.

Zhai, et al., "Efficient Quadtree Based Block-shift Filtering for Deblocking and Deringing," J. Vis. Comun. Image Represent. Nov. 2009, 27 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Cheng et al., "CE8 Subtestl: Improved Deblocking Filter", JCT-VC Meeting; MPEG Meeting; Jan. 20-28, 2011; DAEGU; (Joint Collaborative Team on Video Coding of ISO/IEC JTC1/SC29/WG11 and ITU-T SG. 16); No. JCTVC-D163, 8 pp.

Ikeda, et al., "Parallel deblocking filter", MPEG Meeting; Jan. 24-28, 2011; DAEGU; (Motion Picture Expert Group or ISO/IEC JTC1/SC29/WG11), No. 11119027, 7 pp.

International Preliminary Report on Patentability—PCT/US2012/039989—The International Bureau of WIPO Geneva Switzerland Oct. 2, 2013, 8 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Narroschke, M. et al., "Decisions for deblocking", Mar. 10, 2011, No. JCTVC-E251, Mar. 16-23, 2011, 11 pp.

Wiegand et al., "WD1: Working Draft 1 of High-Efficiency Video Coding", JCTVC-C403, 3rd Meeting: Guangzhou, CN, Oct. 7-15, 2010, 137 pp.

Yi, et al., "Low-Complexity Tools in AVS Part 7", Journal of Computer Science and Technology, May 1, 2006, pp. 345-353, vol. 21, No. 3, Kluwer Academic Publishers, XP019411313, ISSN: 1860-4749.

Second Written Opinion of international application No. PCT/US2012/039989, dated Jul. 2, 2013, 5 pp.

* cited by examiner

| $p7_0$ | $p6_0$ | $p5_0$ | $p4_0$ | $p3_0$ | $p2_0$ | $p1_0$ | $p0_0$ | $q0_0$ | $q1_0$ | $q2_0$ | $q3_0$ | $q4_0$ | $q5_0$ | $q6_0$ | $q7_0$ |
|---|---|---|---|---|---|---|---|---|---|---|---|---|---|---|---|
| $p7_1$ | $p6_1$ | $p5_1$ | $p4_1$ | $p3_1$ | $p2_1$ | $p1_1$ | $p0_1$ | $q0_1$ | $q1_1$ | $q2_1$ | $q3_1$ | $q4_1$ | $q5_1$ | $q6_1$ | $q7_1$ |
| $p7_2$ | $p6_2$ | $p5_2$ | $p4_2$ | $p3_2$ | $p2_2$ | $p1_2$ | $p0_2$ | $q0_2$ | $q1_2$ | $q2_2$ | $q3_2$ | $q4_2$ | $q5_2$ | $q6_2$ | $q7_2$ |
| $p7_3$ | $p6_3$ | $p5_3$ | $p4_3$ | $p3_3$ | $p2_3$ | $p1_3$ | $p0_3$ | $q0_3$ | $q1_3$ | $q2_3$ | $q3_3$ | $q4_3$ | $q5_3$ | $q6_3$ | $q7_3$ |
| $p7_4$ | $p6_4$ | $p5_4$ | $p4_4$ | $p3_4$ | $p2_4$ | $p1_4$ | $p0_4$ | $q0_4$ | $q1_4$ | $q2_4$ | $q3_4$ | $q4_4$ | $q5_4$ | $q6_4$ | $q7_4$ |
| $p7_5$ | $p6_5$ | $p5_5$ | $p4_5$ | $p3_5$ | $p2_5$ | $p1_5$ | $p0_5$ | $q0_5$ | $q1_5$ | $q2_5$ | $q3_5$ | $q4_5$ | $q5_5$ | $q6_5$ | $q7_5$ |
| $p7_6$ | $p6_6$ | $p5_6$ | $p4_6$ | $p3_6$ | $p2_6$ | $p1_6$ | $p0_6$ | $q0_6$ | $q1_6$ | $q2_6$ | $q3_6$ | $q4_6$ | $q5_6$ | $q6_6$ | $q7_6$ |
| $p7_7$ | $p6_7$ | $p5_7$ | $p4_7$ | $p3_7$ | $p2_7$ | $p1_7$ | $p0_7$ | $q0_7$ | $q1_7$ | $q2_7$ | $q3_7$ | $q4_7$ | $q5_7$ | $q6_7$ | $q7_7$ |

FIG. 7

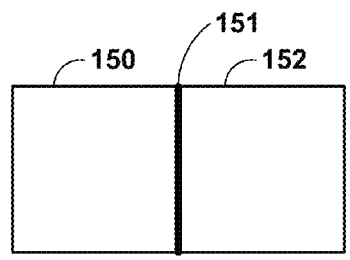
FIG. 11A
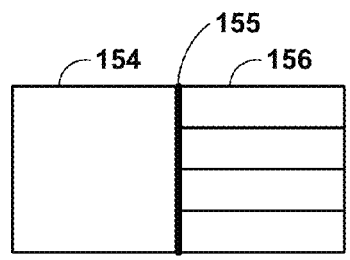
FIG. 11B
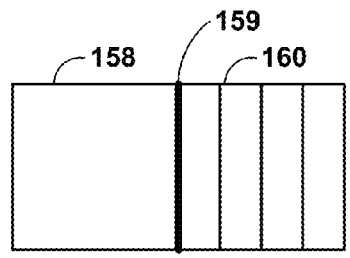
FIG. 11C
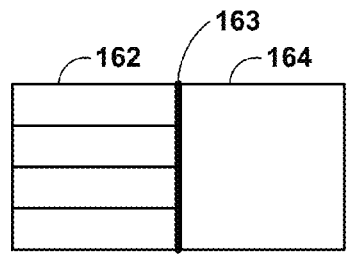
FIG. 11D
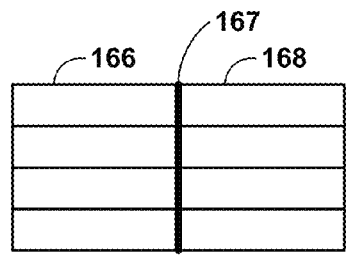
11E
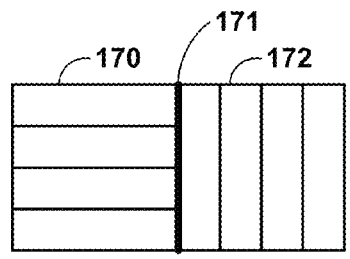
FIG. 11F
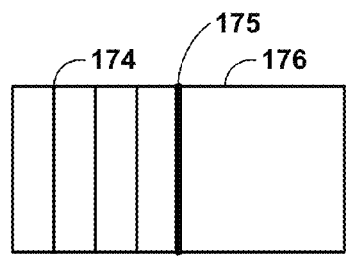
FIG. 11G
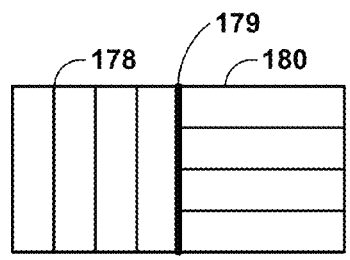
FIG. 11H
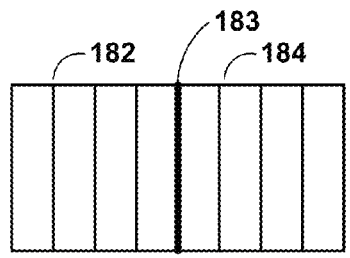
FIG. 11I

DEBLOCKING OF NON-SQUARE BLOCKS FOR VIDEO CODING

This application claims the benefit of U.S. Provisional Applications 61/509,489, filed Jul. 19, 2011, 61/524,491, filed Aug. 17, 2011, 61/534,284, filed Sep. 13, 2011, and 61/555,388, filed Nov. 3, 2011 the entire contents of each of which are hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

SUMMARY

In general, this disclosure describes techniques for deblocking of non-square blocks for video coding. Blocks may be non-square due to a variety of factors such as, for example, asymmetric motion partitioning, short distance intra-prediction, and quadtree transform splitting in non-square transforms. Edges generally occur between blocks of video data, e.g., transform units (TUs). The techniques of this disclosure may improve deblocking decisions and deblocking functions applied to such edges. Likewise, the techniques of this disclosure may avoid excess processing of edges and dramatic increases in storage requirements when processing edges for deblocking.

In one example, a method of coding video data includes decoding a first block of video data and a second block of video data, wherein the first block and the second block share a common edge, and determining whether to deblock the common edge between the first block and the second block based at least in part on whether at least one of the first block and the second block is non-square.

In another example, an apparatus for coding video data includes means for decoding a first block of video data and a second block of video data, wherein the first block and the second block share a common edge, and means for determining whether to deblock the common edge between the first block and the second block based at least in part on whether at least one of the first block and the second block is non-square.

In another example, an apparatus for coding video data includes a video coding device configured to decode a first block of video data and a second block of video data, wherein the first block and the second block share a common edge, and determine whether to deblock the common edge between the first block and the second block based at least in part on whether at least one of the first block and the second block is non-square.

In another example, a computer program product includes a computer-readable storage medium having stored thereon instructions that, when executed, cause a programmable processor to decode a first block of video data and a second block of video data, wherein the first block and the second block share a common edge, and determine whether to deblock the common edge between the first block and the second block based at least in part on whether at least one of the first block and the second block is non-square.

The details of one or more examples are set forth in the accompanying drawings and the description below. Other features, objects, and advantages will be apparent from the description and drawings, and from the claims.

BRIEF DESCRIPTION OF DRAWINGS

FIG. 7 is a conceptual diagram illustrating pixel positions of two example blocks near a common edge between the two blocks.

FIGS. 11A-11I are conceptual diagrams illustrating various examples of short distance intra-prediction (SDIP) partitioned blocks.

DETAILED DESCRIPTION

Figure 1:
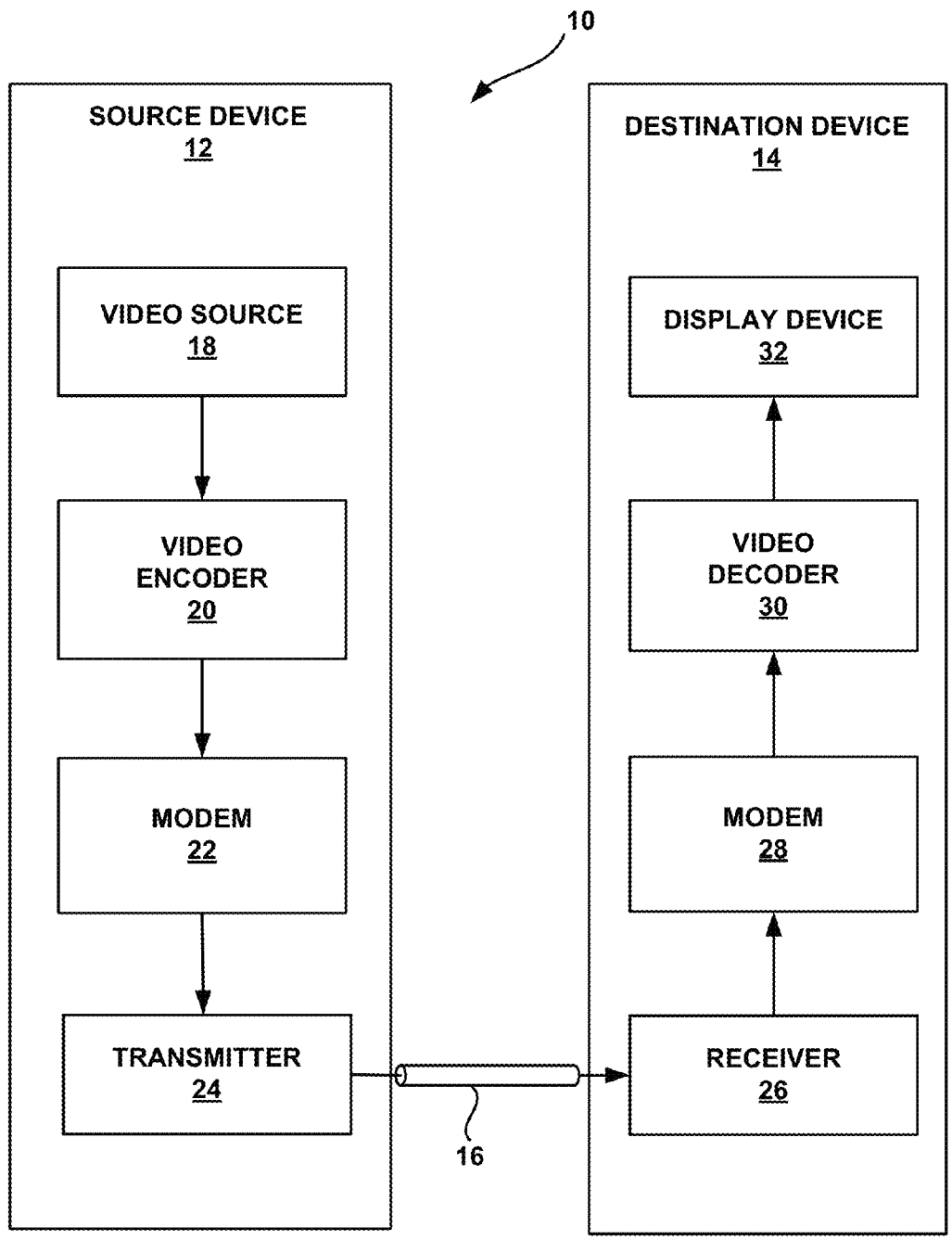
FIG. 1 is a block diagram illustrating an example video encoding and decoding system that may utilize techniques for deblocking edges between non-square blocks.

In general, video data includes a sequence of frames, which may be coded in an intra-prediction mode or an inter-prediction mode. The frames may be divided into blocks of video data and an encoding mode may be selected for each block. In inter-prediction modes, the blocks may be predicted relative to data of one or more previously coded frames. In intra-prediction modes, the blocks may be predicted relative to one or more neighboring, previously coded blocks of the same frame Efforts are currently in progress to develop a new video coding standard, currently referred to as High Efficiency Video Coding (HEVC). The upcoming standard is also referred to as H.265. The standardization efforts are based on a model of a video coding device referred to as the HEVC Test Model (HM). The HM presumes several capabilities of video coding devices over devices according to, previous coding standards, such as ITU-T H.264/AVC. For example, whereas H.264 provides nine intra-prediction encoding modes, HM provides as many as thirty-four intra-prediction encoding modes.

In accordance with High Efficiency Video Coding (HEVC), frames may be divided into largest coding units (LCUs), which may comprise, for example, 32×32 pixel blocks or 64×64 pixel blocks. In general, LCUs may be partitioned into sub-coding units (sub-CUs), each of which may be further partitioned. In general, the term coding unit (CU) may refer to an LCU or any sub-CU thereof (e.g., a sub-CU of an LCU or a sub-CU of another sub-CU). CUs may be partitioned into four square, non-overlapping blocks. An LCU may correspond to a quadtree data structure that includes one or more nodes, where a root node of the quadtree corresponds to the LCU itself and other nodes correspond to sub-CUs of the LCU. An unpartitioned CU generally corresponds to a leaf node of the quadtree (that is, a node of the quadtree that does not have any child nodes). Accordingly, an unpartitioned CU may be referred to as a leaf-node CU. Leaf node CUs generally include one or more prediction units (PUs) that describe how data for the CU is predicted, and one or more transform units (TUs) which correspond to residual data, that is, pixel-by-pixel differences between predicted data for the CU and original data for the CU.

A leaf node for an unpartitioned CU may include information indicating prediction modes for PUs of the CU. In some examples, a residual quadtree (RQT) (also referred to as a TU quadtree) may be provided for leaf-node CUs. The residual quadtree may also include a root note, and one or more leaf nodes. The RQT may include information, such as information indicating prediction modes and/or other prediction information for TUs corresponding to a portion of the corresponding leaf node CU. In any case, information for a CU may indicate prediction modes for one or more portions of the CU.

With respect to intra-prediction modes, information provided in the RQT may indicate a particular type of intra-prediction mode. For example, the information provided in the RQT may indicate whether a DC prediction mode is used, or whether a direction intra-prediction mode is used. In the DC prediction mode, values for neighboring pixels of previously coded blocks may be aggregated and used to form predicted values for pixels of the current CU. In directional prediction modes, values for neighboring pixels of previously coded blocks may be applied in a particular direction to form predicted values for pixels of the current CU.

The HM provides for de-blocking using de-blocking filters to remove "blockiness" artifacts. That is, after dividing a frame into blocks (LCUs and sub-CUs thereof), coding the blocks, and then decoding the blocks, perceptible artifacts at edges between the blocks may occur. Therefore, video encoders may encode video data of a frame, then subsequently decode the encoded video data, and then apply deblocking filters to the decoded video data for use as reference video data. Reference data may be data from one or more frames that a video encoder may use, for example, for inter-prediction of subsequently coded video data. A video encoder may store one or more frames within a reference frame store for inter-prediction.

Such deblocking filtering performed by a video coding device, such as a video encoder or video decoder, prior to storing the decoded video data for use as reference data is generally referred to as "in-loop" filtering. In "In-loop" filtering a video encoder or decoder may perform the de-blocking within a video loop. Video encoders may begin with receiving raw video data, encoding the video data, de-blocking the data, and storing de-blocked frames in a reference frame store. Video decoders may be configured to decode received video data, and then apply the same deblocking filters to the decoded video data, for purposes of displaying the video data as well as for use as reference for subsequent video data to be decoded. By configuring both encoders and decoders to apply the same deblocking techniques, the encoders and decoders can be synchronized, such that deblocking does not introduce error for subsequently coded video data using the deblocked video data for reference.

As stated above, an unpartitioned CU (that is, a leaf-node CU) may include one or more PUs and/or TUs, which may each be further subdivided. PUs and/or TUs may be divided into rectangular or square regions separated by an edge that may introduce perceptible blockiness artifacts. A video encoder or decoder configured in accordance with the techniques described in HM may generally determine, for each edge separating two PUs or TUs, whether to apply a deblocking filter to deblock the edge. The video encoder or decoder configured according to the techniques of HM may be configured to determine whether to deblock an edge based on an analysis of one or more lines of pixels perpendicular to the edge, for example, a line of 8 pixels. Thus, for example, for a vertical edge, the HM may determine whether to deblock the edge by examining four pixels to the left and four pixels to the right of the edge along a common line. The number of pixels selected generally corresponds to the smallest block for deblocking, for example 8×8 pixels. In this manner, the line of pixels used for analysis may enter only two PUs or TUs, namely the PUs or TUs immediately to the left and to the right of an edge. The line of pixels used for analysis of whether to perform deblocking for an edge is also referred to as a set of support pixels, or simply "support."

A device configured in accordance with the techniques of HM may implement motion prediction techniques, such as AMP (asymmetric motion partitioning), and quadtree transform splitting in non-square transforms, such as NSQT (non-square transform for symmetric motion partition or non-square quadtree transform) to split CUs into non-square pixel regions, such as 64×16, 64×48, 16×64, 48×16, 32×8, 32×24, 8×32, 24×32, 16×4, 16×12, 4×16, 12×16, 8×4, 4×8, 8×2, 2×8, 1×16, 16×1, 32×2, 2×32, etc.

A device configured according to the techniques described in HM may also implement intra-prediction techniques, such as short distance intra-prediction (SDIP), that split PUs into non-square regions, such as 64×16, 64×48, 16×64, 48×16, 32×8, 32×24, 8×32, 24×32, 16×4, 16×12, 4×16, 12×16, 8×4, 4×8, 8×2, 2×8, 1×16, 16×1, 32×2, 2×32, etc. A video coding unit, such as a video encoder or a video decoder configured to implement SDIP may predict the value of a non-square block from the pixel values of a neighboring non-square region.

The present deblocking filter in the HM software test model of the JCT-VC standardization effort addresses blocking artifacts on the 8×8 minimum block basis, and does not deblock artifact edges located at positions that are not a multiple of 8 pixel locations. In addition, the HM deblocking filter supports parallel implementations of deblocking decisions and independent filtering for vertical or horizontal edges.

Non-square partitions or transforms of NSQT and AMP that have a dimension smaller than the minimum size for deblocking of 8×8 pixels (such as 16×4 and 4×16 PUs and TUs) are not necessarily treated by the HM deblocking filter, which may lead to block edge artifacts being visible. That is, edges that occur at block boundaries that are not multiples of 8-pixels may have blockiness artifacts that are not properly handled by the deblocking filter of the HM encoder or decoder. In addition, the present HM deblocking decisions and filters have supports (number of pixels used for computations and/or number of pixels to be replaced or modified) that maximally employ 4 pixels on each side of an edge. In the case when a non-square block has a dimension that is smaller than 8, the deblocking decisions and filters potentially overlap and dependencies are introduced that break the HM deblocking filter parallelism. In addition to breaking the HM deblocking filter parallelism, race conditions and/or non-deterministic behavior may result if the HM deblocking filters are used in parallel with blocks smaller than 8 pixels. For example, a first de-blocking filter of a video encoder may examine a set of support pixels while the same set of support pixels is being modified by another de-blocking filter executing in parallel with the first de-blocking filter. In this manner, the deblocking decision functions may be applied to support which crosses block boundaries, and thus, leads to improper decisions regarding whether to deblock an edge, and moreover, may disrupt parallelism that may otherwise be achieved.

Video coding devices may be configured to execute deblocking decision functions relative to the support for a particular edge. In general, deblocking decision functions may be configured to detect high-frequency changes within the support. A high frequency change may occur at the edge between two blocks. By examining the pixel values, a video encoder or decoder may detect high frequency changes that may contribute to blockiness artifacts relative to a particular edge.

Typically, when a high frequency change is detected, the deblocking decision function provides an indication that deblocking should occur. Therefore, a deblocking decision function may provide an improper indication that an edge between two blocks, such as non-square blocks predicted using SDIP or AMP or transform blocks corresponding to NSQT blocks, should be deblocked. For example, the deblocking decision function may detect a high frequency change within the set of support pixels when analyzing an edge, but the high frequency change may occur at a boundary between two PUs or TUs, other than at the edge currently being considered.

This disclosure provides techniques for deblocking edges occurring between non-square blocks, such as asymmetric motion partitioned (AMP) blocks, SDIP blocks, and non-square quadtree transform (NSQT) blocks. A video coding device, such as a video encoder or a video decoder, may be configured to adapt pixel support for deblocking decision functions and/or deblocking filters applied to edges between such blocks. In this manner, the deblocking decisions and filters for deblocking the edges of non-square NSQT transform blocks, SDIP blocks, and/or AMP partitions with dimensions that are smaller than 8 pixels may be adapted. For example, the pixel support region of such blocks may be adapted by modifying decision functions, filter types and filter strengths, in order to avoid including support used for de-blocking other nearby edges into the computation of the deblocking decisions and/or filtering, and to avoid filter result dependencies between nearby edges.

When narrow, non-square partitions have one or more edges perpendicular to an edge to be deblocked, whether present on both sides of the edge to be deblocked or only on one side and a square partition on the other, regular HM deblocking can be employed to the edge to be deblocked. As stated above, non-square partitions may be between two PUs or TUs, which have been partitioned with NSQT, AMP, and/or SDIP. According to the current version of HM, deblocking for a particular coding unit proceeds first with deblocking vertical edges, and then with deblocking horizontal edges. While deblocking a vertical edge, the de-blocker may change some support used later in deblocking one or more horizontal edges, but doing so will not necessarily create a race condition between horizontal and vertical deblocking. While deblocking a vertical edge, the de-blocker may change some support used later in deblocking one or more horizontal edges, but doing so will not necessarily create a race condition between horizontal and vertical deblocking.

When at least one narrow non-square partition or transform is parallel to the edge to be considered for deblocking, deblocking decisions and filters may be adapted to avoid interdependencies between filtering of nearby edges and to avoid including nearby edges in the deblocking decisions and filtering. Moreover, in the case when at least one narrow non-square partition or transform is parallel to the edge to be considered for deblocking, the deblocking decision (also referred to as a "deblocking on/off decision") of the present HM may be applied to the current edge to be deblocked. The deblocking on/off decision may be computed based on three samples on both sides of the edge for positions two and five along an eight-pixel section parallel to the edge under deblocking consideration.

The techniques of this disclosure are generally directed to determining whether to deblock an edge between two video blocks, e.g., two CUs, two PUs, or two TUs, based at least in part on whether one or both of the blocks is non-square. For example, a video coding device may determine whether either or both of two PUs is an asymmetric motion partition (e.g., an asymmetric PU), is intra-predicted using SDIP, or whether either or both of two TUs is an NSQT block. In some examples, when the set of support pixels cross one or more block edges, deblocking is simply skipped. In other examples, the decision of whether to perform deblocking may be made using alternative support regions, which may be selected such that the support regions do not cross block edges. For example, the distance (in pixels) between block edges may be mapped to an adapted support region, such that the adapted support region spans a reduced number of pixels and therefore does not cross additional block edges.

In some examples, the techniques of this disclosure include determining, in addition to whether either or both blocks sharing a common edge are non-square, whether the longer (e.g., narrower) sections of the blocks are parallel to the common edge between the blocks. In general, if blocks are perpendicular to the common edge for which a deblocking determination is being made, then the analysis need not change from conventional deblocking determinations. That is, because the line of support pixels runs parallel to the blocks in these situations, the standard set of support pixels will not cross additional edges between the blocks, and thus, lead to a correct determination of whether to deblock the common edge.

In some examples, a video coding device may determine whether to deblock a common edge between two blocks based on whether at least one of the blocks is non-square, e.g., due to the use of AMP, NSQT, or SDIP for coding the block. In some examples, a video coding device may be configured to skip deblocking of an edge between two blocks when at least one of the blocks is non-square. In other examples, a video coding device may be configured to apply a modified deblocking decision function or filter to pixels near the edge such that the deblocking decision function does not cross multiple block boundaries or such that the pixels to which the filters are applied do not overlap.

This disclosure provides modified deblocking decision functions and deblocking filters that may avoid crossing of multiple boundaries and overlap of pixels to which the filters are applied. In this manner, these modified filters may yield more accurate deblocking decisions, and may also enable parallelism when performing the deblocking process. For example, the deblocking process may be performed as two or more software threads executing in parallel, and/or performed by two or more hardware units operating in parallel.

FIG. 1 is a block diagram illustrating an example video encoding and decoding system 10 that may utilize techniques for deblocking edges between non-square blocks. As shown in FIG. 1, system 10 includes a source device 12 that transmits encoded video to a destination device 14 via a communication channel 16. Source device 12 and destination device 14 may comprise any of a wide range of devices. In some cases, source device 12 and destination device 14 may comprise wireless communication devices, such as wireless handsets, so-called cellular or satellite radiotelephones, or any wireless devices that can communicate video information over a communication channel 16, in which case communication channel 16 is wireless.

The techniques of this disclosure, however, which concern deblocking edges between non-square blocks, are not necessarily limited to wireless applications or settings. For example, these techniques may apply to over-the-air television broadcasts, cable television transmissions, satellite television transmissions, Internet video transmissions, encoded digital video that is encoded onto a storage medium, or other scenarios. Accordingly, communication channel 16 may comprise any combination of wireless, wired, or storage media suitable for transmission or storage of encoded video data.

In the example of FIG. 1, source device 12 includes a video source 18, a video encoder 20, a modulator/demodulator (modem) 22 and a transmitter 24. Destination device 14 includes a receiver 26, a modem 28, a video decoder 30, and a display device 32. In accordance with this disclosure, video encoder 20 of source device 12 may be configured to apply the techniques for deblocking edges between non-square blocks. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for deblocking edges between non-square blocks may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

Receiver 26 of destination device 14 receives information over channel 16, and modem 28 demodulates the information. Again, the video encoding process may implement one or more of the techniques described herein to deblocking edges between non-square blocks. The information communicated over channel 16 may include syntax information defined by video encoder 20, which is also used by video decoder 30, that includes syntax elements that describe characteristics and/or processing of macroblocks and other coded units, for example, groups of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14. In other examples, source device 12 may store encoded data onto a storage medium, rather than transmitting the data. Likewise, destination device 14 may be configured to retrieve encoded data from a storage medium.

Video encoder 20 and video decoder 30 may operate according to a video compression standard, such as the forthcoming ITU-T High Efficiency Video Coding (HEVC) standard, also referred to as "H.265." Video encoder 20 and video decoder 30 may conform to the High Efficiency Video Coding Test Model (HM). The techniques of this disclosure, however, are not limited to any particular coding standard. Other examples include MPEG-2 and ITU-T H.263, and ITU-T H.264/AVC (Advanced Video Coding). Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The HEVC standard is currently being formulated by the ITU-T Video Coding Experts Group (VCEG) together with the ISO/IEC Moving Picture Experts Group (MPEG) as the product of a collective partnership known as the Joint collaborative Team on Video Coding (JCT-VC). The HM presumes several capabilities of video coding devices over devices according to, previous coding standards, such as ITU-T H.264/AVC. For example, whereas H.264 provides nine intra-prediction encoding modes, HM provides as many as thirty-four intra-prediction encoding modes.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), wireless communication devices that include a video coding device, such as encoder or decoder, discrete logic, software, hardware, firmware or any combinations thereof. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or the like.

A video sequence typically includes a series of video frames. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. Video encoder 20 typically operates on video blocks, also referred to as CUs, within individual video frames in order to encode the video data. A video block may correspond to an LCU or a partition of an LCU. The video blocks may have fixed or varying sizes, and may differ in size according to a specified coding standard. Each video frame may include a plurality of slices. Each slice may include a plurality of LCUs, which may be arranged into partitions, also referred to as sub-CUs.

As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

Smaller video blocks can provide better resolution, and may be used for locations of a video frame that include high levels of detail. In general, blocks and the various partitions, sometimes referred to as sub-blocks, may be considered video blocks. In addition, a slice may be considered to be a plurality of video blocks, such as blocks and/or sub-blocks. Each slice may be an independently decodable unit of a video frame. Alternatively, frames themselves may be decodable units, or other portions of a frame may be defined as decodable units. The term "coded unit" may refer to any independently decodable unit of a video frame such as an entire frame or a slice of a frame, a group of pictures (GOP) also referred to as a sequence, or another independently decodable unit defined according to applicable coding techniques.

Following intra-predictive or inter-predictive coding to produce predictive data and residual data, and following any transforms (such as the 4×4 or 8×8 integer transform used in H.264/AVC or a discrete cosine transform DCT) to produce transform coefficients, quantization of transform coefficients may be performed. Quantization generally refers to a process in which transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m.

HEVC refers to a block of video data as a coding unit (CU), which may include one or more prediction units (PUs) and/or one or more transform units (TUs). Syntax data within a bitstream may define a largest coding unit (LCU), which is a largest coding unit in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be further split into sub-CUs. Syntax data for a bitstream may define a maximum number of times an LCU may be split, referred to as CU depth. Accordingly, a bitstream may also define a smallest coding unit (SCU). This disclosure also uses the term "block" to refer to any of a CU, PU, or TU.

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, 4 sub-CUs of a leaf-CU will also be referred to as leaf-CUs although there is no explicit splitting of the original leaf-CU. For example if a CU at 16×16 size is not split further, the four 8×8 sub-CUs will also be referred to as leaf-CUs although the 16×16 CU was never split.

Moreover, TUs of leaf-CUs may also be associated with respective quadtree data structures. That is, a leaf-CU may include a quadtree indicating how the leaf-CU is partitioned into TUs. This disclosure refers to the quadtree indicating how an LCU is partitioned as a CU quadtree and the quadtree indicating how a leaf-CU is partitioned into TUs as a TU quadtree. The root node of a TU quadtree generally corresponds to a leaf-CU, while the root node of a CU quadtree generally corresponds to an LCU. TUs of the TU quadtree that are not split are referred to as leaf-TUs.

A leaf-CU may include one or more prediction units (PUs). In general, a PU represents all or a portion of the corresponding CU, and may include data for retrieving a reference sample for the PU. For example, when the PU is inter-mode encoded, the PU may include data defining a motion vector for the PU. The data defining the motion vector may describe, for example, a horizontal component of the motion vector, a vertical component of the motion vector, a resolution for the motion vector (for example, one-quarter pixel precision or one-eighth pixel precision), a reference frame to which the motion vector points, and/or a reference list (e.g., list 0 or list 1) for the motion vector. Data for the leaf-CU defining the PU(s) may also describe, for example, partitioning of the CU into one or more PUs. Partitioning modes may differ depending on whether the CU is uncoded, intra-prediction mode encoded, or inter-prediction mode encoded. For intra coding, a PU may be treated the same as a leaf transform unit described below.

A leaf-CU may include one or more transform units (TUs). The transform units may be specified using a TU quadtree structure, as discussed above. That is, a split flag may indicate whether a leaf-CU is split into four transform units. Then, each transform unit may be split further into 4 sub TUs. When a TU is not split further, it may be referred to as a leaf-TU. In general, a split flag may indicate that a leaf-TU is split into square-shaped TUs. In order to indicate that a TU is split into non-square shaped TUs, other syntax data may be included, for example, syntax data that indicates that TUs are to be partitioned according to NSQT.

Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the predictive values corresponding to the TU and the original block. The residual value may be transformed, quantized, and scanned. For inter coding, a video encoder may perform prediction at the PU level and may calculate a residual for each PU. The residual values corresponding to a leaf-CU may be transformed, quantized, and scanned. For inter coding, a leaf-TU may be larger or smaller than a PU. For intra coding, a PU may be collocated with a corresponding leaf-TU. In some examples, the maximum size of a leaf-TU may be the size of the corresponding leaf-CU.

In general, this disclosure uses the terms CU and TU to refer to leaf-CU and leaf-TU, respectively, unless noted otherwise. In general, the techniques of this disclosure relate to transforming, quantizing, scanning, and entropy encoding data of a CU. As an example, the techniques of this disclosure include selection of a transform to use to transform a residual value of an intra-predicted block based on an intra-prediction mode used to predict the block. This disclosure also uses the term "directional transform" or "designed transform" to refer to such a transform that depends on intra-prediction mode direction. That is, a video encoder may select a directional transform to apply to a transform unit (TU). As noted above, intra-prediction includes predicting a TU of a current CU of a picture from previously coded CUs and TUs of the same picture. More specifically, a video encoder may intra-predict a current TU of a picture using a particular intra-prediction mode.

Following quantization, entropy coding of the quantized data may be performed, e.g., according to content adaptive variable length coding (CAVLC), context adaptive binary arithmetic coding (CABAC), probability interval partitioning entropy coding (PIPE), or another entropy coding methodology. A processing unit configured for entropy coding, or another processing unit, may perform other processing functions, such as zero run length coding of quantized coefficients and/or generation of syntax information such as coded block pattern (CBP) values, macroblock type, coding mode, maximum macroblock size for a coded unit (such as a frame, slice, macroblock, or sequence), or the like.

Deblocking may generally be performed following inverse quantization and inverse transformation of video data. Video encoder 20 may be configured to perform inverse quantization and inverse transformation to store decoded blocks to be used as reference for predicting subsequent blocks, e.g., in the same frame or frames to be temporally predicted. In accordance with the techniques of this disclosure, video encoder 20 and/or video decoder 30 may be configured to perform deblocking techniques. For example, video encoder 20 and video decoder 30 may be configured to decode a first block of data and a second block of video data. Both the first and second blocks may share a common edge. In the case of video encoder 20, video encoder 20 may encode the first block and the second block, which encoder 20 may later decode. Video encoder 20 or video decoder 30 may determine whether to deblock the common edge between the first and second blocks based at least in part on whether at least one of the first and second blocks is non-square.

In an example, video encoder 20 and video decoder 30 may be configured to adapt deblocking decision functions and/or deblocking filters for deblocking an edge between two blocks based at least on part on whether the blocks are non-square. As another example, video encoder 20 and video decoder 30 may be configured to adapt deblocking decision functions and/or deblocking filters for deblocking an edge between two blocks based at least on part on whether the blocks have at least one dimension that is shorter than a corresponding length of a set of support filters for the deblocking decision function and/or the deblocking filter.

In some examples, video encoder 20 and video decoder 30 (which may generally be referred to as video coding devices) may adapt deblocking decision functions and/or deblocking filters for blocks that have at least one dimension smaller than 8 pixels. The deblocking decisions and filters for deblocking the edges of non-square quadtree transform blocks, SDIP partitions, or AMP partitions with dimensions smaller than 8 pixels may be modified to adapt their pixel support region. For example, video encoder 20 and/or video decoder 30 may be configured to modify deblocking decision functions, filter types, and/or filter strengths, in order to avoid including nearby edges into the computation of deblocking decisions or filtering, and to avoid filter result dependencies between nearby edges.

Video encoder 20 and/or video decoder 30 may also be configured to employ conventional HM deblocking to an edge under consideration for deblocking when narrow non-square partitions are perpendicular to the edge to be deblocked, on both sides of the edge to be deblocked or only on one side and a square partition on the other. When at least one narrow non-square partition or transform is parallel to the edge to be deblocked, video encoder 20 and/or video decoder 30 may adapt deblocking decision functions and/or deblocking filters to avoid interdependencies between filtering of nearby edges and to avoid including nearby edges in the deblocking decisions and filtering.

In some examples, video encoder 20 or video decoder 30 may obtain information about a first block indicating that the block is partitioned using asymmetric motion partitioning and that the block is a partition of a parent block, such as a CU. Because the first block is partitioned using AMP in this example, the first block is considered non-square. More specifically, video encoder 20 may determine to partition the parent block using AMP, or video decoder 30 may receive information from a video encoder, such as video encoder 20, indicating that the parent block was partitioned using AMP. The information may indicate that the parent block was partitioned using asymmetric motion partitioning to form the first block. In another example, video encoder 20 and video decoder 30 may be configured to obtain information indicating that a first block of a parent block comprises a non-square quadtree transform block of the parent block. Video encoder 20 or video decoder 30 may determine that the first block is non-square based on the obtained information indicating that the first block comprises the non-square quadtree transform block of the parent block. More specifically, video encoder 20 may determine to partition the parent block using NSQT, or video decoder 30 may receive information from a video encoder, such as video encoder 20, indicating that the parent block was partitioned using NSQT. The information may indicate that the parent block was partitioned using a non-square quadtree transform to form the first block.

In an example, video encoder 20 and video decoder 30 may be configured to obtain information indicating that a first block of a parent block comprises a short distance intra-prediction block of the parent block. Video encoder 20 or video decoder 30 may determine that the first block is non-square based on the obtained information indicating that the first block comprises the short distance intra-prediction block of the parent block. More specifically, video encoder 20 may determine to partition the parent block using SDIP, or video decoder 30 may receive information from a video encoder, such as video encoder 20, indicating that the parent block was partitioned using SDIP. The information may indicate that the parent block was partitioned using a non-square quadtree transform to form the first block.

In accordance with some examples of the techniques of this disclosure, video encoder 20 and video decoder 30 may determine whether to deblock a common edge between a first block and a second block based on whether at least one of the first block and the second block is non-square. In some examples, video encoder 20 and video decoder 30 may further determine, after determining that at least one of the first block and the second is non-square, whether a narrow portion of the non-square block(s) is perpendicular to the common edge. Video encoder 20 or decoder 30 may further apply a first adapted deblocking decision function to pixels of the first block and the second block when the first block is non-square, and in some examples, when the narrow portion of the first block is not perpendicular to the common edge. Video encoder 20 and video decoder 30 may apply a second adapted deblocking decision function to pixels of the first block and the second block when the second block is non-square and, in some examples, when the narrow portion of the second block is not perpendicular to the common edge. Video encoder 20 or decoder 30 may apply a third adapted deblocking decision function to pixels of the first block and the second block when the first block is non-square, when the narrow portion of the first block is not perpendicular to the common edge, when the second block is non-square, and when the narrow portion of the second block is not perpendicular to the common edge. Video encoder 20 and decoder 30 may further apply a conventional deblocking decision function to pixels of the first block and the second block when the first block is square or the narrow portion of the first block is perpendicular to the common edge and when the second block is either square or the narrow portion of the second block is perpendicular to the common edge.

In some examples, where the common edge has a length of eight pixels, applying the third adapted deblocking decision function to the pixels of the first block and the second block includes applying the third adapted deblocking decision function to a first set of pixels perpendicular to the common edge at a first location two pixels from an end of the common edge. Additionally, video encoder 20 or video decoder 30 may apply the third adapted deblocking decision function to a second, different set of pixels perpendicular to the common edge at a second location five pixels from the end of the common edge.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). An apparatus including video encoder 20 and/or video decoder 30 may comprise an integrated circuit, a microprocessor, and/or a wireless communication device, such as a cellular telephone.

Figure 2:
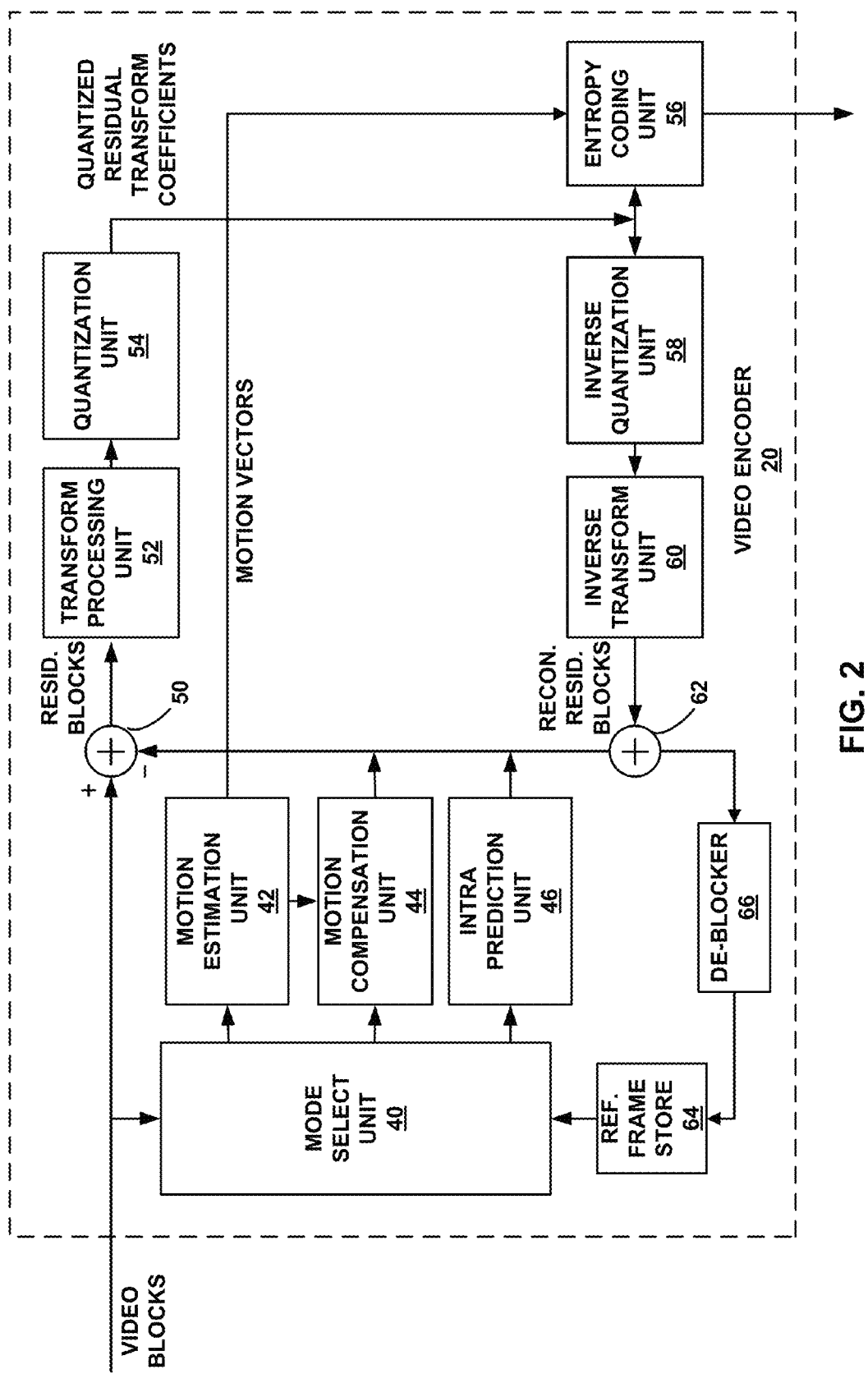
FIG. 2 is a block diagram illustrating an example of a video encoder that may implement techniques for deblocking edges between non-square blocks.

FIG. 2 is a block diagram illustrating an example of video encoder 20 that may implement techniques for deblocking edges between non-square blocks. Video encoder 20 may perform intra- and inter-coding of blocks within video frames, including CUs, or sub-CUs of CUs. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to any of several spatial based compression modes and inter-modes such as uni-directional prediction (P-mode) or bi-directional prediction (B-mode) may refer to any of several temporal-based compression modes. Although components for inter-mode encoding are depicted in FIG. 2, it should be understood that video encoder 20 may further include components for intra-mode encoding. However, such components are not illustrated for the sake of brevity and clarity.

As shown in FIG. 2, video encoder 20 receives a current video block within a video frame to be encoded. In the example of FIG. 2, video encoder 20 includes motion compensation unit 44, motion estimation unit 42, reference frame store 64, summer 50, transform processing unit 52, quantization unit 54, entropy coding unit 56, and deblocker 66. For video block reconstruction, video encoder 20 also includes inverse quantization unit 58, inverse transform unit 60, and summer 62.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal compression. An intra prediction unit may also perform intra-predictive coding of the received video block relative to one or more neighboring blocks in the same frame or slice as the block to be coded to provide spatial compression.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame.

Motion estimation unit 42 and motion compensation unit 44 may be highly integrated, but are illustrated separately for conceptual purposes. Motion estimation is the process of generating motion vectors, which estimate motion for video blocks. A motion vector, for example, may indicate the displacement of a predictive block within a predictive reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. A motion vector may also indicate displacement of a partition of a macroblock. Motion compensation may involve fetching or generating the predictive block based on the motion vector determined by motion estimation. Again, motion estimation unit 42 and motion compensation unit 44 may be functionally integrated, in some examples.

Motion estimation unit 42 calculates a motion vector for the video block of an inter-coded frame by comparing the video block to video blocks of a reference frame in reference frame store 64. Motion compensation unit 44 may also interpolate sub-integer pixels of the reference frame, e.g., an I-frame or a P-frame. As an example, motion vectors may be predicted from two lists of reference frames: list 0, which includes reference frames having a display order earlier than a current frame being encoded, and list 1, which includes reference frames having a display order later than the current frame being encoded. Therefore, data stored in reference frame store 64 may be organized according to these lists.

Motion estimation unit 42 compares blocks of one or more reference frames from reference frame store 64 to a block to be encoded of a current frame, e.g., a P-frame or a B-frame. When the reference frames in reference frame store 64 include values for sub-integer pixels, a motion vector calculated by motion estimation unit 42 may refer to a sub-integer pixel location of a reference frame. Motion estimation unit 42 and/or motion compensation unit 44 may also be configured to calculate values for sub-integer pixel positions of reference frames stored in reference frame store 64 if no values for sub-integer pixel positions are stored in reference frame store 64. Motion estimation unit 42 sends the calculated motion vector to entropy coding unit 56 and motion compensation unit 44. The reference frame block identified by a motion vector may be referred to as a predictive block.

Motion compensation unit 44 may calculate prediction data based on the predictive block. Video encoder 20 forms a residual video block by subtracting the prediction data from motion compensation unit 44 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms, such as those defined by the H.264 standard, which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Quantization unit 54 quantizes the residual transform coefficients to further reduce bit rate. The quantization process may reduce the bit depth associated with some or all of the coefficients. The degree of quantization may be modified by adjusting a quantization parameter.

Following quantization, entropy coding unit 56 entropy codes the quantized transform coefficients. For example, entropy coding unit 56 may perform content adaptive variable length coding (CAVLC), context adaptive binary arithmetic coding (CABAC), probability interval partitioning entropy coding (PIPE), or another entropy coding technique. Following the entropy coding by entropy coding unit 56, the encoded video may be transmitted to another device or archived for later transmission or retrieval. In the case of context adaptive binary arithmetic coding, context may be based on neighboring macroblocks.

In some cases, entropy coding unit 56 or another unit of video encoder 20 may be configured to perform other coding functions, in addition to entropy coding. For example, entropy coding unit 56 may be configured to determine the CBP values for the macroblocks and partitions. Also, in some cases, entropy coding unit 56 may perform run length coding of the coefficients in a LCU or sub-CU of an LCU. In particular, entropy coding unit 56 may apply a zig-zag scan or other scan pattern to scan the transform coefficients in a LCU or partition and encode runs of zeros for further compression. Entropy coding unit 56 also may construct header information with appropriate syntax elements for transmission in the encoded video bitstream.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame store 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame store 64. The reconstructed video block may be used by motion estimation unit 42 and motion compensation unit 44 as a reference block to inter-code a block in a subsequent video frame.

In accordance with the techniques of this disclosure, video encoder 20 includes de-blocker 66 that selectively filters the output of summer 62. In particular, de-blocker 66 receives reconstructed video data from summer 62, which corresponds to predictive data received from either motion compensation unit 44 or intra-prediction unit 46, added to inverse quantized and inverse transformed residual data. In this manner, de-blocker 66 receives decoded blocks of video data, e.g., CUs of an LCU, LCUs of a slice or frame, PUs of a CU, and/or TUs of a CU. In general, de-blocker 66 selectively filters the blocks of video data, for example, based on whether either or both of the blocks are non-square. De-blocker 66 may be configured to determine whether to deblock an edge between two blocks based on whether the blocks are PUs that are asymmetric motion partitions, short distance intra-prediction partitions, NSQT TUs that split CUs into non-square regions, or other such non-square blocks. In some examples, de-blocker 66 may be generally configured to determine whether support for a deblocking decision and/or a deblocking filter will extend beyond two blocks forming an edge to be deblocked, and if so, to modify either or both of the deblocking decision function and/or the deblocking filter accordingly.

De-blocker 66 is generally configured to analyze pixels of two neighboring blocks (e.g., two CUs, PUs, or TUs) near an edge between the two blocks to determine whether to deblock the edge. More particularly, de-blocker 66 may alter the values of the pixels near the edge when a high-frequency change in values is detected. De-blocker 66 may also be configured to perform any or all of the techniques of this disclosure. For example, de-blocker 66 may be configured to adapt support for deblocking decision functions and/or deblocking filters for deblocking processes directed to edges of non-square NSQT transform blocks, SDIP partitions, and/or AMP partitions with dimensions that are smaller than 8 pixels.

De-blocker 66 may include predefined adapted sets of support, or calculate adapted sets of support on the fly. De-blocker 66 may thereby avoid including nearby edges into the computation of the deblocking decisions or deblocking filtering, and to avoid filter result dependencies between nearby edges. De-blocker 66 may also skip support adaptation when narrow blocks on either or both sides of an edge under consideration for deblocking are perpendicular to the edge. When at least one narrow non-square partition or transform is parallel to the edge to be deblocked, de-blocker 66 may adapt deblocking decision functions and/or deblocking filters to avoid interdependencies between filtering of nearby edges and to avoid including nearby edges in the deblocking decisions and filtering.

Figure 3:
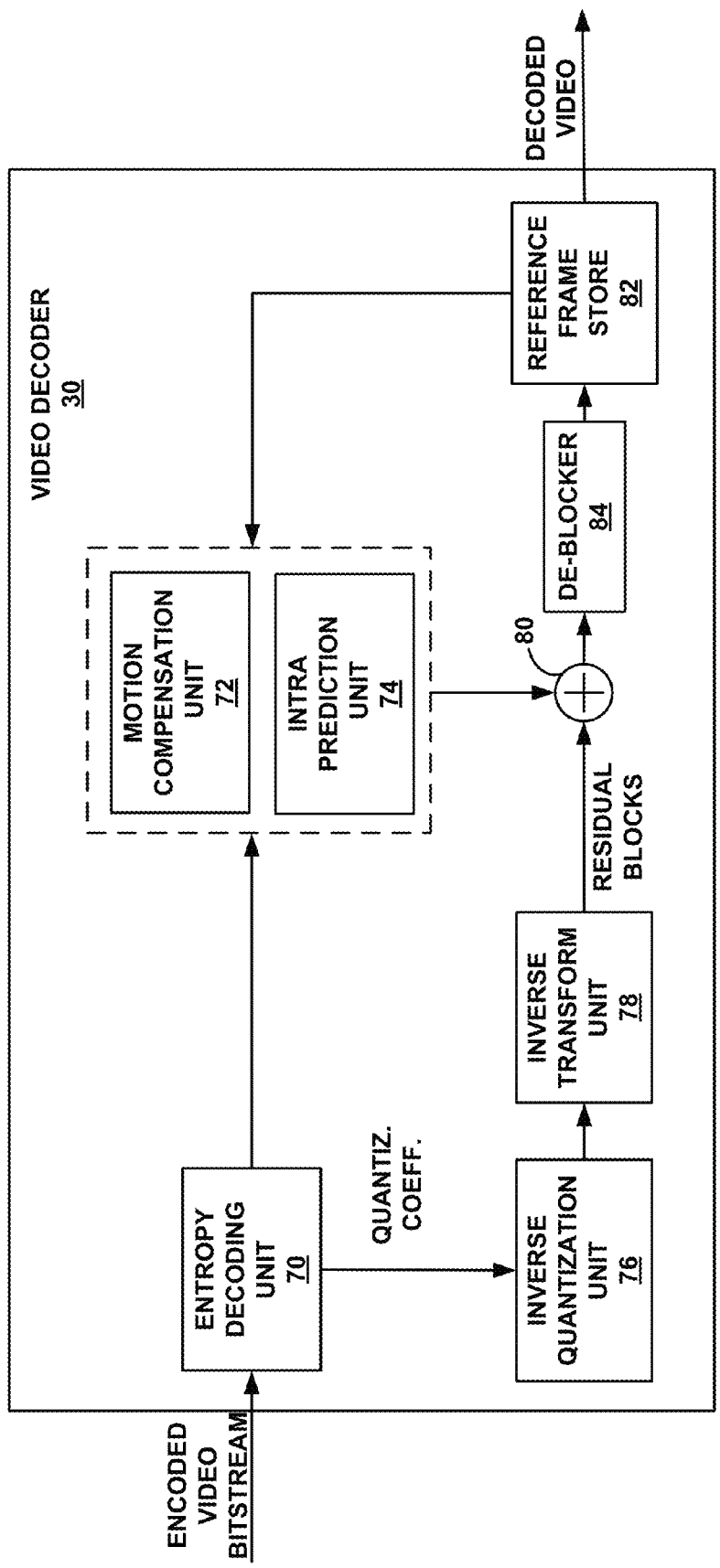
FIG. 3 is a block diagram illustrating an example of a video decoder, which decodes an encoded video sequence.

FIG. 3 is a block diagram illustrating an example of video decoder 30, which decodes an encoded video sequence. In the example of FIG. 3, video decoder 30 includes an entropy decoding unit 70, motion compensation unit 72, intra prediction unit 74, inverse quantization unit 76, inverse transformation unit 78, reference frame store 82, summer 80, and de-blocker 84. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70.

Motion compensation unit 72 may use motion vectors received in the bitstream to identify a prediction block in reference frames in reference frame store 82. Intra prediction unit 74 may use intra prediction modes received in the bitstream to form a prediction block from spatially adjacent blocks. Inverse quantization unit 76 inverse quantizes, i.e., de-quantizes, the quantized block coefficients provided in the bitstream and decoded by entropy decoding unit 70. The inverse quantization process may include a conventional process, e.g., as defined by the H.264 decoding standard. The inverse quantization process may also include use of a quantization parameter $QP_Y$ calculated by encoder 50 for each macroblock to determine a degree of quantization and, likewise, a degree of inverse quantization that should be applied.

Inverse transform unit 58 applies an inverse transform, e.g., an inverse DCT, an inverse integer transform, or a conceptually similar inverse transform process, to the transform coefficients in order to produce residual blocks in the pixel domain. Motion compensation unit 72 produces motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Motion compensation unit 72 uses some of the syntax information to determine sizes of macroblocks used to encode frame(s) of the encoded video sequence, partition information that describes how each macroblock of a frame of the encoded video sequence is partitioned, modes indicating how each partition is encoded, one or more reference frames (and reference frame lists) for each inter-encoded macroblock or partition, and other information to decode the encoded video sequence.

Summer 80 sums the residual blocks with the corresponding prediction blocks generated by motion compensation unit 72 or intra-prediction unit to form decoded blocks. De-blocker 84 selectively deblocks CUs, including TUs and PUs of CUs, received from summer 80 in accordance with any or all of the techniques of this disclosure. De-blocker 84 conforms substantially to de-blocker 66 (FIG. 2), in that de-blocker 84 may be configured to perform any or all of the techniques described with respect to de-blocker 66.

Figure 4:
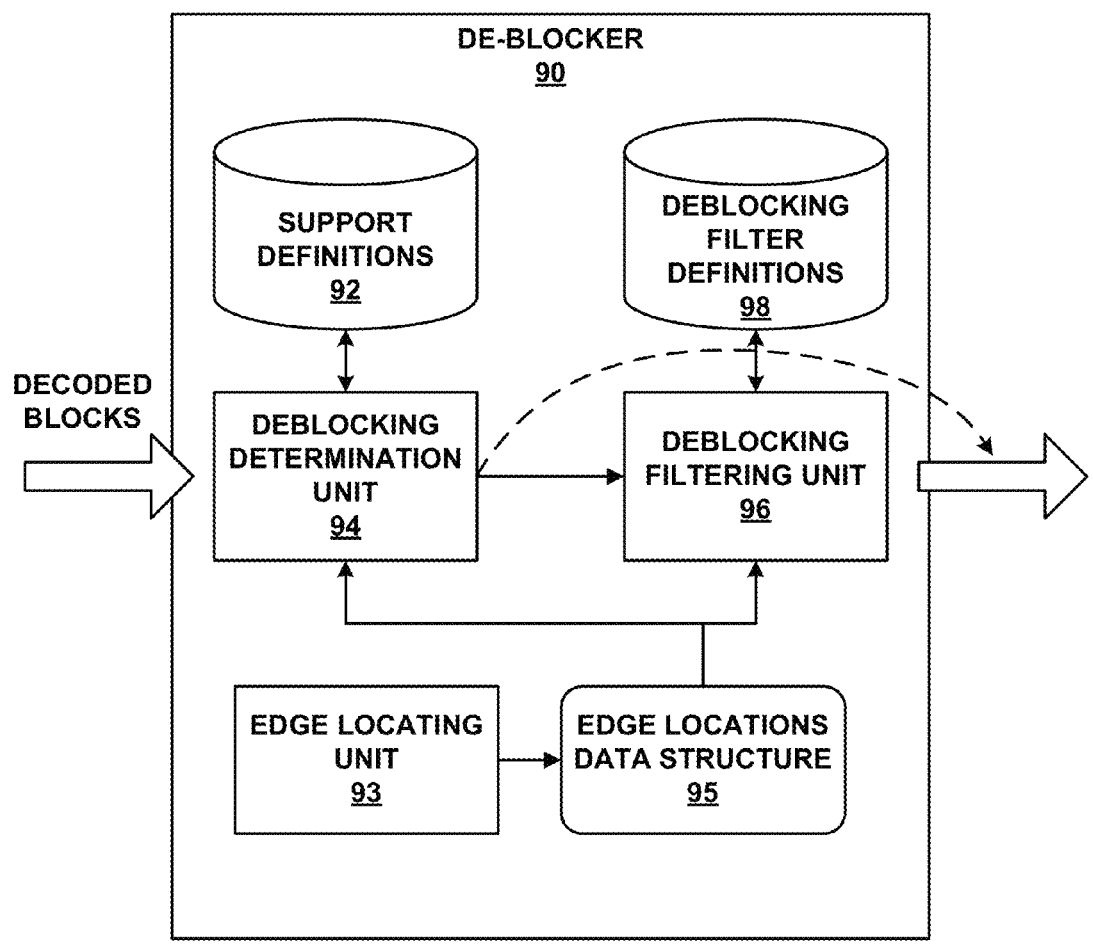
FIG. 4 is a block diagram illustrating components of an example de-blocker.

FIG. 4 is a block diagram illustrating components of an example de-blocker 90. In general, either or both of de-blocker 66 (FIG. 2) and de-blocker 84 (FIG. 3) may include components substantially similar to those of de-blocker 90. Other video coding devices, such as video encoders, video decoders, video encoder/decoders (CO-DECs), and the like may also include components substantially similar to de-blocker 90. De-blocker 90 may be implemented in hardware, software, or firmware. When implemented in software or firmware, corresponding hardware (such as one or more processors or processing units and memory for storing instructions for the software or firmware) may also be provided.

In the example of FIG. 4, de-blocker 90 includes deblocking determination unit 94, support definitions 92, deblocking filtering unit 96, deblocking filter definitions 98, edge locating unit 93, and edge locations data structure 95. Any or all of the components of de-blocker 90 may be functionally integrated. The components of de-blocker 90 are illustrated separately only for purposes of illustration. In general, de-blocker 90 receives data for decoded blocks, e.g., from a summation component that combines prediction data with residual data for the blocks. The data may further include an indication of how the blocks were predicted. In the example described below, de-blocker 90 is configured to receive data including a decoded LCU and a CU quadtree for the LCU, where the CU quadtree describes how the LCU is partitioned into CUs and describes the prediction modes for leaf-node CUs. The data may also include information indicating partitioning of leaf-node CUs into PUs and TUs, which may further indicate whether the PUs are asymmetric motion partitions and/or whether the TUs are NSQT partitions. A TU quadtree may indicate whether TUs are NSQT partitions and/or whether TUs correspond to asymmetric motion partition PUs.

De-blocker 90 may maintain edge locations data structure 95 in a memory of de-blocker 90, or in an external memory provided by a corresponding video coding device. In some examples, edge locating unit 93 may receive a CU quadtree corresponding to an LCU that indicates how the LCU is partitioned into CUs. Edge locating unit 93 may then analyze the CU quadtree to determine edges between CUs in the LCU that are candidates for deblocking.

Edge locations data structure 95 may comprise an array having a horizontal dimension, a vertical dimension, and a dimension representative of horizontal edges and vertical edges. In general, edges between CUs may occur between two smallest-sized CUs of the LCU. Thus, assuming that the LCU has a size of N×N, and assuming that the smallest-sized CU of the LCU is of size M×M, the array may comprise a size of [N/M]×[N/M]×2, where '2' represents the two possible directions of edges between CUs (horizontal and vertical). For example, assuming that an LCU has 64×64 pixels and a 8×8 smallest-sized CU, the array may comprise [8]×[8]×[2] entries.

Each entry of edge locations data structure 95 may generally correspond to a possible edge between two CUs. Edges might not in fact exist at each of the positions within the LCU corresponding to each of the entries of edge locations data structure 95. For example, not all CUs of an LCU are necessarily divided down to the size of the smallest-sized CU, which may be 8×8 pixels. However, edge locations data structure 95 may include a number of entries sufficient to represent all possible edge locations, for example, when an LCU is completely divided into smallest-sized CUs. Edge locating unit 93 may analyze the quadtree data structure for an LCU to determine where actual edges exist between sub-CUs of the LCU, and to store information in edge locations data structure 95 representative of whether the location in the LCU corresponding to an entry of edge locations data structure 95 is in fact an edge between two sub-blocks of the LCU.

Accordingly, values of the data structure corresponding to non-existent edges may be initialized to false. In general, edge locating unit 93 may analyze the CU quadtree to determine locations of edges between two CUs of the LCU and set corresponding values in edge locations data structure 95 to true. In some examples, edge locating unit 93 may perform a traversal of the CU quadtree, and the traversal may be performed in parallel, using parallel hardware, multithreading techniques, and/or another mechanism to exploit parallelism.

In general, the entries of edge locations data structure 95 may describe whether a corresponding edge exists in the LCU as a candidate for deblocking That is, when edge locating unit 93 determines that an edge between two neighboring CUs of the LCU exists, edge locating unit 93 may set a value of the corresponding entry in edge locations data structure 95 to indicate that the edge exists (e.g., to a value of "true"). In some examples, the determination of whether or not an edge is a candidate for deblocking may be performed in parallel, using hardware, multithreading, and/or another technique to exploit parallelism. Using multithreading, a plurality of threads may access edge locations data structure 95 to determine if the vertical edges are candidates for deblocking. In the example where edge locations data structure 95 is an array, each thread may access one or more rows or columns in the array. Once all the vertical edge candidates have been identified, the same process may be repeated for the horizontal edge candidates or vice versa.

In some examples, when one of the two CUs is predicted using SDIP, edge locating unit 93 may store a value indicative of the type of SDIP partitions used for the CU in the corresponding location of edge locations data structure 95. In this manner, edge locations data structure 95 need not include additional entries to represent additional possible edges within the LCU. Instead, the types of values that may be stored in edge locations data structure 95 may be modified, in accordance with the techniques of this disclosure, to store either Boolean values or SDIP flags.

Deblocking determination unit 94 generally determines whether, for two neighboring blocks (for example, two CUs, PUs, or TUs), an edge between the two blocks should be deblocked. Deblocking determination unit 94 may determine locations of edges using edge locations data structure 95. When a value of edge locations data structure 95 has a Boolean value, deblocking determination unit 94 may determine that a "true" value indicates the presence of an edge, and a "false" value indicates that no edge is present, in some examples.

In general, deblocking determination unit 94 is configured with one or more deblocking determination functions. A deblocking determination function may determine whether or not to apply deblocking to a particular edge based on a result of the function. The functions may include a plurality of coefficients applied to lines of pixels that cross the edge between blocks, such as two CUs. For example, the functions may be applied to a line of eight pixels that is perpendicular to the edge, where four of the pixels are in one of the two blocks and the other four pixels are in the other of the two blocks. Depending on the shape and size of the support functions, the functions may be adapted to use greater or fewer pixels. Support definitions 92 define support for the functions. In general, the "support" corresponds to the pixels to which the functions are applied.

Deblocking determination unit 94 may be configured to apply one or more deblocking determination functions to one or more sets of support, as defined by support definitions 92, to determine whether a particular edge between two blocks of video data should be deblocked. In some examples, however, deblocking determination unit 94 is configured to skip application of the deblocking determination functions to a particular edge or to adapt deblocking decision functions and/or deblocking filters for the particular edge. Deblocking determination unit 94 may be configured to skip application of the deblocking determination functions or adapt deblocking decision functions when blocks are non-square, and/or when a block has a dimension smaller than 8 pixels. In this manner, de-blocker 90 (and likewise, the corresponding video coding device including de-blocker 90) may be configured to determine whether to deblock an edge between two blocks based at least in part on whether at least one of the two blocks is non-square, for example, an AMP PU, an SDIP PU, or an NSQT TU.

In other examples, de-blocker 90 may be configured to determine whether to deblock an edge between two blocks based at least in part on whether at least one of the two blocks is non-square using other techniques. For example, de-blocker 90 may be configured to adapt deblocking decision functions and/or deblocking filters for deblocking edges of non-square NSQT transform blocks, SDIP PUs, and/or AMP partitions with dimensions that are smaller than 8 pixels or the smallest CU size indicated in information corresponding to a slice, frame, GOP, or other unit including a plurality of LCUs. De-blocker 90 may be configured to modify decision functions, filter types, and/or filter strengths, in order to avoid including nearby edges into the computation of the deblocking decisions or filtering, and to avoid filter result dependencies between nearby edges.

When narrow, non-square partitions are perpendicular to the edge to be deblocked, on both sides of the edge to be deblocked or only on one side and a square partition on the other, regular HM deblocking can be employed to the edge to be deblocked. In some examples, deblocking for a particular coding unit may proceed first with deblocking vertical edges, and then with deblocking horizontal edges, although deblocking horizontal edges followed by vertical edges is also possible. Without loss of generality, this disclosure describes deblocking of vertical edges followed by horizontal edges. While deblocking a vertical edge, de-blocker 90 may change some support used later in deblocking one or more horizontal edges, but doing so will not necessarily create a race condition between horizontal and vertical deblocking. When at least one narrow, non-square partition or transform is parallel to the edge to be deblocked, de-blocker 90 may adapt deblocking decision functions and/or deblocking filters to avoid interdependencies between filtering of nearby edges and to avoid including nearby edges in the deblocking decisions and filtering. FIG. 5, discussed in greater detail below, provides various examples of narrow blocks that are parallel to and perpendicular to a current edge.

The dashed line originating from deblocking determination unit 94 represents data for blocks being output without being filtered. In cases where deblocking determination unit 94 determines that an edge between two blocks should not be filtered, de-blocker 90 may output the data for the blocks without altering the data. That is, the data may bypass deblocking filtering unit 96. As an example, de-blocker 90 may determine that two blocks should not be filtered if they have overlapping sets of support for a de-blocking function and/or for a de-blocking function. On the other hand, when deblocking determination unit 94 determines that an edge should be deblocked, deblocking determination unit 94 may cause deblocking filtering unit 96 to filter values for pixels near the edge, to deblock the edge.

Deblocking filtering unit 96 retrieves definitions of deblocking filters from deblocking filter definitions 98 for edges to be deblocked, as indicated by deblocking determination unit 94. For edges between non-square blocks, deblocking filtering unit 96 may retrieve adapted deblocking filters from deblocking filter definitions 98, such that the filters do not cross additional boundaries. In general, filtering of an edge uses values of pixels from the neighborhood of a current edge to be deblocked. Therefore, both deblocking decision functions and deblocking filters may have a certain support region on both sides of an edge. By applying a deblocking filter to pixels in the neighborhood of an edge, deblocking filtering unit 96 may smooth the values of the pixels such that high frequency transitions near the edge are dampened. In this manner, application of deblocking filters to pixels near an edge may reduce blockiness artifacts near the edge.

In an example, a video decoding device, such as video encoder 20 or video decoder 30 of FIGS. 1-3, may include a deblocking unit conforming substantially to the example of de-blocker 90. Video encoder 20 or video decoder 30 may be configured to apply a de-blocking function when an adapted decision function indicates that a common edge between two blocks should be deblocked. The deblocking function may comprise:

$$\Delta=(9*(q0-p0)-3*(q1-p1)+8)/16$$

$$\Delta=\mathrm{Clip}(-tc,tc,\Delta),$$

wherein tc is HM deblocking threshold that depends on a quantization parameter (QP) for at least one of the first and second blocks $$p0'=p0+\Delta$$

$$q0'=q0-\Delta.$$

In this example, delta ($\Delta$) refers to a value that is used to modify pixel values, e.g., p0 and q0. That is, in this example, p0' and q0' are calculated by adding the calculated delta value to p0 and subtracting the calculated delta value from q0, respectively. Moreover, in this example, the delta value is calculated based on values of p0, q0, p1, and q1. Example positions of p0, q0, p1, and q1 are discussed with respect to FIG. 7, below.

As another example, the de-blocking function may comprise:

$$\Delta=(9*(q0-p0)-3*(q1-p1)+8)/16$$

$$\Delta=\mathrm{Clip}(-tc,tc,\Delta),$$

wherein tc is HM deblocking threshold that depends on a quantization parameter (QP) for at least one of the first and second blocks $$p0'=p0+\Delta$$

$$q0'=q0-\Delta$$

$$p1'=p1+\Delta/2$$

$$q1'=q1-\Delta/2.$$

In this example, delta ($\Delta$) again refers to a value that is used to modify pixel values. In this example, however, the calculated delta value is used to modify four pixel values near an edge, e.g., p0, q0, p1, and q1. More specifically, in this example, p0' and q0' are calculated by adding the calculated delta value to p0 and subtracting the calculated delta value from q0, respectively. Furthermore, p1' and q1' are calculated by adding one-half of the calculated delta value to p1 and subtracting one-half of the calculated delta value from q1, respectively.

In the examples above, delta is calculated using only two pixels on either side of an edge, namely, p0, p1, q0, and q1. Therefore, if there are two edges that are four pixels apart, delta values for each edge may be calculated without overlap. Thus, pixel values on either side of the edge may safely be manipulated without concern that such manipulation may affect the results of filtering being applied to a neighboring, nearby edge. In this manner, these examples of the techniques of this disclosure may improve parallel processing of deblocking filtering of non-square blocks for video coding.

Figure 5A:
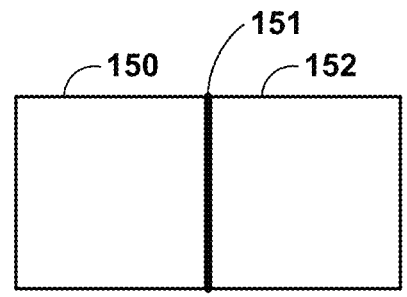
FIGS. 5A-5C are conceptual diagrams illustrating various block orientations relative to an edge between two blocks.
Figure 5B:
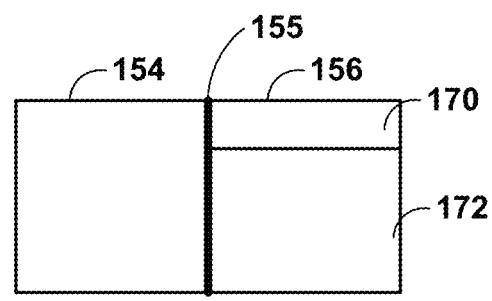
Figure 5C:
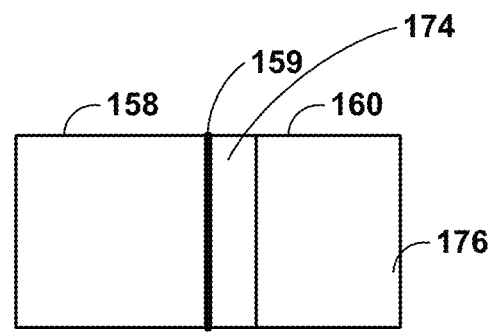

FIGS. 5A-5C are conceptual diagrams illustrating various block orientations relative to an edge between two blocks, such as between two PUs, TUs, or CUs. Although examples of side-by-side blocks are shown, it should be understood that similar de-blocking techniques may be applied with respect to top-bottom neighboring blocks. FIG. 5A depicts blocks 150, 152 having edge 151. In this example, blocks 150 and 152 are both square. Therefore, edge 151 may be processed for deblocking normally (that is, without further consideration or adaptation due to being non-square). Normal de-blocking may correspond generally to the standard de-blocking filter defined in the current draft of HEVC.

FIG. 5B depicts blocks 154, 156 having edge 155. In this example, block 154 includes two non-square partitions, 170, 172. For example, partitions 170, 172 may comprise adaptive motion partition PUs (or TUs corresponding thereto), two NSQT TUs, or other non-square transforms in quadtree transform splitting. Although block 156 includes non-square partitions 170, 172, non-square partitions 170, 172 are perpendicular to edge 155, in this example. That is, the narrow portions of partitions 170, 172 extend perpendicular to edge 155. Therefore, lines of support (which are generally perpendicular to edge 155) will be parallel to the edges between partitions 170, 172 of block 156. Accordingly, edge 155 may be processed for deblocking normally as well. It should be understood that partitions 170, 172, which may be PUs, TUs, or CUs are also considered "blocks" for purposes of this disclosure. In particular, partitions 170, 172 are examples of non-square blocks.

FIG. 5C depicts blocks 158 and 160 having edge 159. In this example, block 160 includes two non-square partitions 174, 176. In this case, depending on the width of partitions 174, 176 of block 160, a region of support may cross a boundary between partitions 174, 176. Accordingly, processing of edge 159 for deblocking may include utilizing adapted deblocking decision functions, support, and/or deblocking filters. The adaptations may be performed to avoid crossing the boundary between partitions 174, 176 when processing edge 159 for deblocking. It should be understood that partitions 174, 176, which may be partitions of PUs, TUs, or CUs, are also considered "blocks" for purposes of this disclosure. In particular, partitions 174, 176 are examples of non-square blocks.

Figure 6:
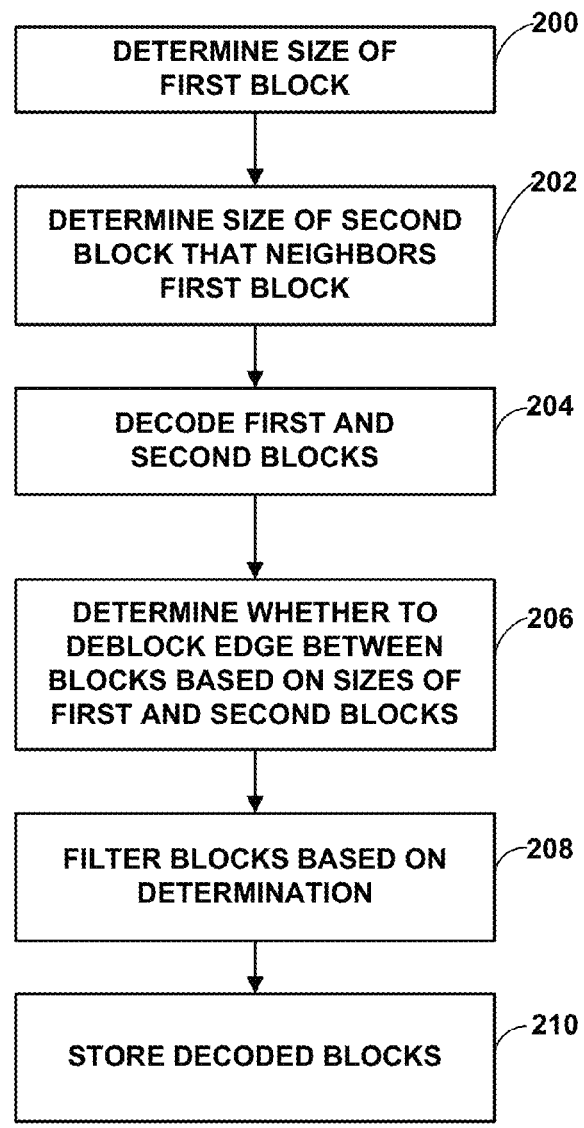
FIG. 6 is a flowchart illustrating an example method for deblocking an edge between two blocks in accordance with the techniques of this disclosure.

FIG. 6 is a flowchart illustrating an example method in accordance with the techniques of this disclosure. Although the techniques of FIG. 6 are described as performed by de-blocker 90 (FIG. 4), it should be understood that these techniques may be performed by any video coding device, e.g., video encoder 20, video decoder 30, a video encoder/decoder (CODEC), a processor executing instructions to encode or decode video data, or other such devices. Furthermore, the steps of FIG. 6 are not necessarily performed in the order illustrated, but may be performed in other sequences or in parallel, in some examples.

Initially, de-blocker 90 may determine a size of a first block (200). As an example, de-blocker 90 may determine the size of the first block by analyzing the LCU quadtree structure or by looking at data of a CU, including partition information associated with the PUs or TUs of the CU. De-blocker 90 may also determine a size of a second block that neighbors the first block (202). De-blocker 90 may determine the size of the second block in a manner similar to determining the size for the first block. Because the second block neighbors the first block, the first and second block share a common edge. Accordingly, de-blocker 90 may construct edge locations data structure 95 to indicate the presence of a common edge between the first and second blocks. A video coding device, such as a video encoder, or a video decoder, including de-blocker 90 may decode the first and second blocks (204). Both video encoders and video decoders may be configured to decode blocks, where video encoders may decode blocks for the purpose of producing reference data used when encoding subsequent video data.

Following decoding of the blocks, de-blocker 90 may determine whether to deblock the common edge between the first and second blocks. In accordance with the techniques of this disclosure, deblocking determination unit 94 of de-blocker 90 may determine whether to deblock the common edge between the first and second blocks based on the determined sizes for the first and second blocks (206). In some examples, a video encoder, such as video encoder 20 of FIGS. 1 and 3, may also encode the first and second blocks, prior to decoding the first and second blocks.

In another example, de-blocker 90 may also receive information indicating that the first and/or second block is non-square, e.g., as an asymmetric motion partition, SDIP partition, or non-square transform partition of a parent block. De-blocker 90 may determine that the first and/or second block is non-square based on the received information. De-blocker 90 may further determine whether to deblock the common edge between the first and second block based on whether at least one of the first and second block is non-square. In some examples, de-blocker 90 may obtain the information by a video decoder as syntax information for an encoded bitstream comprising the first block and the second block.

De-blocker 90 may additionally utilize one or more deblocking determination functions to determine whether or not to de-block the edge between the first and second blocks. The deblocking decision function may decide whether or not to de-block the edge based on the presence of one or more high frequency transitions near the edge. In an example, de-blocker 90 may be configured to determine whether to de-block the common edge based on whether either or both of the first and second blocks are non-square, e.g., as a result of asymmetric motion partitioning, short distance intra-prediction, non-square transforms resulting from symmetric motion partitioning, or other quadtree transform splitting that may result in non-square transforms.

In some examples, de-blocking determination unit 94 may be configured to adapt a deblocking decision function when either or both of the first and second blocks are non-square. De-blocking determination unit 94 may adapt the deblocking decision function by modifying the function and/or support on the fly, or by selected a previously adapted deblocking decision function. In some examples, de-blocking determination unit 94 may be configured to adapt the deblocking decision function when narrow portions of non-square blocks are parallel (and thus not perpendicular) to the common edge between the first and second blocks.

Furthermore, deblocking filtering unit 96 may be configured to apply an adapted deblocking filter to the edge when the decision is made to deblock the edge. For example, deblocking filtering unit 96 may select an adapted deblocking filter or adapt the deblocking filter on the fly. The adapted deblocking filter may correspond to an adapted filter type and/or filter strength. In general, the adapted deblocking filter, as with the adapted deblocking determination function, may avoid including nearby edges into the computation of the deblocking decisions (or filtering) and avoid filter result dependencies between nearby edges. In this manner, de-blocker 90 may filter the blocks based on the determination (208). De-blocker 90 may then store decoded, potentially edge-deblocked, blocks (210), for example, for use as reference for subsequently coded video blocks. That is, subsequently coded blocks may rely on data from the potentially filtered reference blocks when a video encoder or decoder is performing inter- or intra-prediction. When de-blocker 90 is included in a video decoder, the video decoder may then output the decoded blocks, for example, to a display device such as display device 32 (FIG. 1).

In this manner, FIG. 6 represents an example of a method for coding video data, the method including decoding a first block of video data and a second block of video data, wherein the first block and the second block share a common edge, and determining whether to deblock the common edge between the first block and the second block based at least in part on whether at least one of the first block and the second block is non-square.

FIG. 7 is a conceptual diagram illustrating pixel positions of two example blocks 230, 232 near edge 234 between blocks 230 and 232. Edge 234 has a length of eight pixels in this example. Each of the pixel positions is designated using the format [p|q]I$_J$, where p corresponds to block 230 and q corresponds to block 232, I corresponds to a distance from edge 234, and J corresponds to a row indicator from top to bottom of blocks 230 and 232. In some examples, support used for deblocking decision functions and deblocking filters has a line of eight pixels. In such examples, for a given line X where 0≤X≤7, each of pixels p3$_X$ to q3$_X$ may be used as support. Accordingly, for these examples, if either of blocks 230 or 232 is predicted using SDIP, and the SDIP mode is vertical with a partition width less than four, the eight-pixel support would cross an SDIP PU boundary. In other examples, blocks 230, 232 may be predicted using another narrow, non-square partition or transformed using a narrow, non-square transform.

Data for PUs of a CU predicted using SDIP, may be predicted from the values of pixels from neighboring CUs or neighboring SDIP partitions. SDIP PUs may be non-square regions, such as rectangles. Partitions may be vertical or horizontal, that is, the edges defining the partition within the CU may be oriented vertically or horizontally. Thus, using the standard HM deblocking filter would cross a PU boundary of a vertical SDIP partition if the SDIP partition has a width less than 4 pixels and is located adjacent to a vertical edge. If an SDIP partition has an edge perpendicular to the vertical edge however, the ordinary HM deblocking filter may be used.

Blocks 230 and 232 are illustrated as square blocks. It should be understood that blocks 230 and 232 may represent coding units (CUs), and may be partitioned according to SDIP or AMP, such that PU boundaries exist within blocks 230 and/or 232, for example, between pixels p2x and p1x and/or q1x and q2x. Alternatively or additionally, blocks 230 and/or 232 may be partitioned according to NSQT, such that TU boundaries exist within blocks 230 and/or 232, for example, between pixels p2x and p1x and/or q1x and q2x.

In some examples, there may be at least one narrow non-square partition or transform that is parallel to edge 234, which is an edge under consideration for deblocking in this example. That is, video encoder 20 and/or video decoder 30 may be configured to determine whether to deblock edge 234, which may be based at least in part on whether the decision function would cross a boundary between a narrow, non-square partition or transform. When there is at least one narrow, non-square partition or transform parallel to edge 234, video encoder 20 and/or video decoder 30 may be configured to adapt deblocking decisions and filters to avoid interdependencies between filtering of nearby edges and to avoid including nearby edges in the deblocking decisions and filtering.

Moreover, in such a case, the deblocking on/off decision function from conventional HM may be applied to edge 234 (more particularly, pixels of blocks 230, 232 near edge 234) to determine whether to deblock edge 234. For example, video encoder 20 and/or video decoder 30 may be configured to apply a deblocking decision function to three samples on both sides of edge 234 for locations 2 and 5 along edge 234 of length 8 samples. For example, video encoder 20 and/or video decoder 30 may apply the deblocking decision function first to pixels p2$_2$, p1$_2$, p0$_2$, q0$_2$, q1$_2$, and q2$_2$, and then to pixels p2$_5$, p1$_5$, p0$_5$, q0$_5$, q1$_5$, and q2$_5$. In this manner, video encoder 20 and/or video decoder 30 may apply the deblocking decision function to a first set of pixels perpendicular to common edge 234 at a first location that is two pixels from an end of common edge 234, and to a second set of pixels also perpendicular to common edge 234 at a second location that is five pixels from the same end of common edge 234. The samples may be of the reconstructed type or pre-deblocking filtering.

In case the deblocking decision is "on" (e.g., the deblocking decision function, or a result of applying the deblocking decision function to one or more sets of pixels, possibly with an aggregation, averaging, or other operation to produce a final result) indicates that edge 234 should be deblocked) for current edge 234, the following deblocking filter may be applied, which includes elements that are conceptually similar to the weak luma filter adopted into HEVC from JCTVC-F118:

$$\Delta=(9*(q0-p0)-3*(q1-p1)+8)/16$$

$$\Delta=\text{Clip}(-tc,tc,\Delta)$$

(tc is HM deblocking threshold, such as described in JCTVC-F803, depending on QP)

$$p0'=p0+\Delta$$

$$q0'=q0-\Delta$$

This filter modifies one sample on both sides of current edge 234. The filter is computed based on two samples on both sides of the edge (Δ), both of which are within two pixels from the edge. In this manner, the dependency between the filtering of nearby edges may be avoided, and the parallel filtering property may be preserved, at least in cases where there are at least four pixels in the partition. De-blocker 90 may not be able to utilize the standard HM deblocking filter in parallel with another filter operating on another, different vertical edge of CU 230 or CU 232. De-blocker 90 may be able to apply the weak filter described above on edges at least 4 pixels apart. By de-blocking edges at least 4 pixels apart, a de-blocker may examine and/or modify two pixels on one side of a first edge and two pixels on the opposite side of a second edge without race conditions or interdependencies.

In this example, two pixels on either side of edge 234 are read to calculate Δ, which represents a value by which to offset the values of the pixels closest to the edge, namely p0j and q0j. The values p0j' and q0j' represent the adjusted values of p0j and q0j after adding Δ.

Alternatively, the following filter may be applied, which modifies two samples on both sides of the edge:

$$\Delta=(9*(q0-p0)-3*(q1-p1)+8)/16$$

$$\Delta=\text{Clip}(-tc,tc,\Delta)$$

(tc is HM deblocking threshold, such as described in JCTVC-F803, depending on QP)

$$p0'=p0+\Delta$$

$$q0'=q0-\Delta$$

$$p1'=p1+\Delta/2$$

$$q1'=q1-\Delta/2$$

In this example, two pixels on either side of edge 234 are read to calculate Δ, which again represents a value by which to offset the values of the pixels closest to edge 234. One half of Δ is used to offset the values of the pixels one-pixel away from edge 234, that is, pixels p1j and q1j.

An additional deblocking decision may be computed to decide between modifying one or two samples on either side of the edge, such as described in JCTVC-F803 from JCTVC-F118.

The filters discussed above are two examples of modified deblocking filters in accordance with this disclosure. Similar modifications may be applied to deblocking decision functions to avoid crossing multiple PU or TU boundaries.

Figure 8:
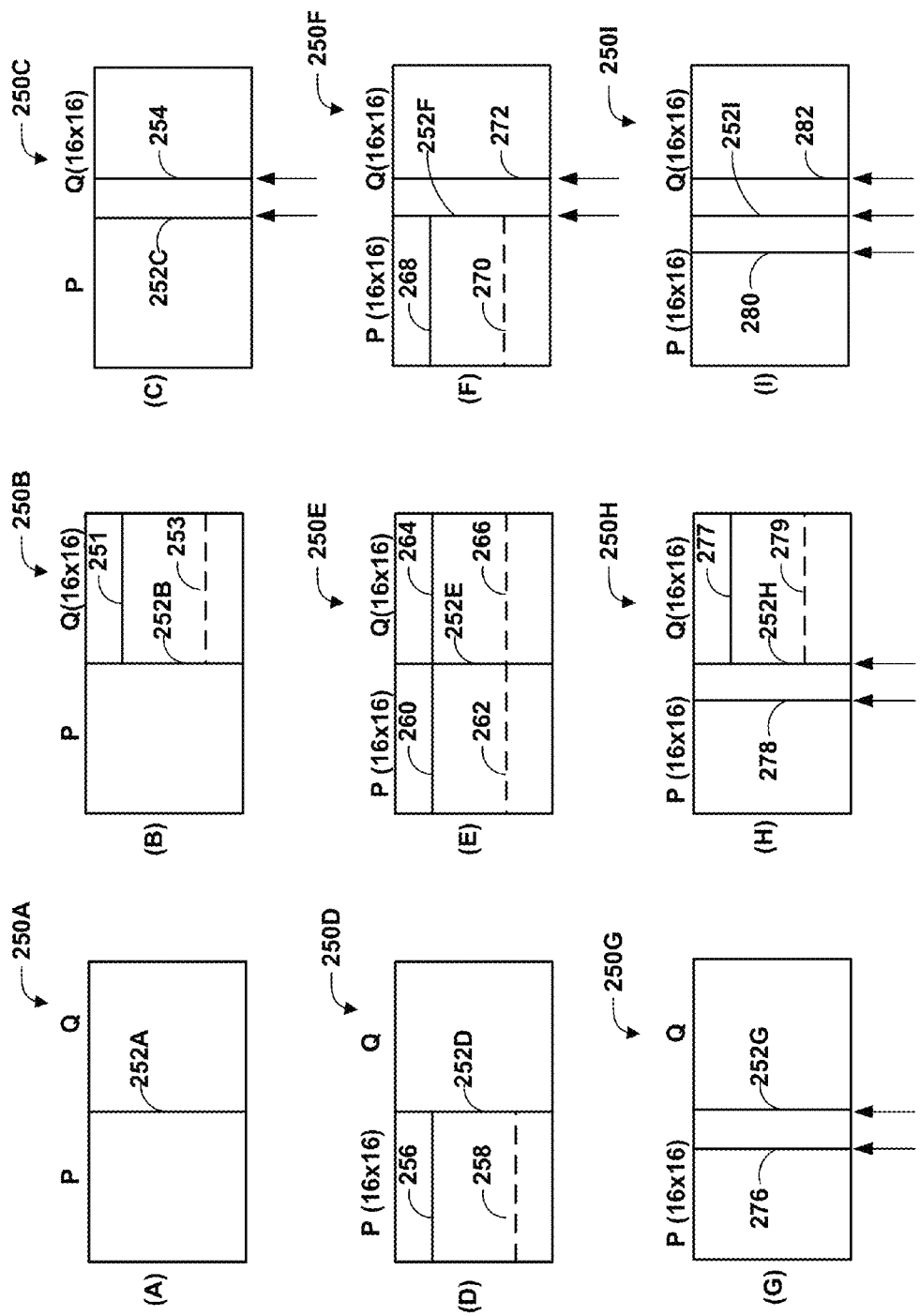
FIG. 8 is a conceptual diagram illustrating various examples of instances where adaptive deblocking decision functions and deblocking filters may be used.

FIG. 8 is a conceptual diagram illustrating various examples of instances where adaptive deblocking decision functions and deblocking filters may be used. In particular, FIG. 8 illustrates block pairs 250A-250I (block pairs 250) including two neighboring blocks, labeled "P" and "Q" in each of pairs 250. In each of pairs 250, block "P" may generally correspond to block 230 (FIG. 7), while block "Q" may generally correspond to block 232 (FIG. 7). Accordingly, each of pairs 250 includes a respective one of boundary line 252A-252I (boundary lines 252) separating blocks P and Q.

The examples of FIG. 8 are described with respect to asymmetric motion partitioning (AMP) techniques, as described above. Blocks P and Q in each of pairs 250 is assumed to have a size of 16×16 pixels, although other sizes of blocks may also be used in accordance with the techniques of this disclosure. Moreover, vertical pairs of blocks may also be analyzed in a similar manner, when determining whether to deblock horizontal boundaries between the vertical pairs of blocks.

In particular, the example pairs 250 of FIG. 8 represent various combinations of AMP-partitioned blocks, and whether deblocking decision functions and deblocking filters would be adapted for AMP boundaries and boundaries between the blocks. That is, FIG. 8 illustrates various AMP cases for left/right neighboring blocks P and Q. Assuming that blocks P and Q are 16×16 CUs, if either of the blocks is partitioned using AMP, and the AMP boundary is parallel and adjacent to the corresponding one of boundaries 252, adapted deblocking decision functions and deblocking filters may be used to avoid overlap when the deblocking decision functions and deblocking filters are applied.

For example, with respect to pair 250A, blocks P and Q are not partitioned using AMP. Therefore, a conventional deblocking decision function and deblocking filter may be used for determining whether to deblock boundary 252A. If boundary 252A is determined to be deblocked, then a conventional deblocking filter may be applied to pixels near boundary 252A to deblock boundary 252A.

With respect to the example of pair 250B, boundary 251 represents a horizontal AMP boundary. That is, block Q in pair 250B represents an example of a block that is partitioned using a 2N×nU AMP partitioning scheme, where boundary 251 results from the 2N×nU partitioning. In 2N×nU AMP partitioning, a 2N×2N block includes a 2N×(N/2) partition on top and a 2N×(3N/2) partition on bottom. Alternatively, block Q of pair 250B may be partitioned using 2N×nD partitioning, which would produce boundary 253. In 2N×nD, a 2N×2N block includes a 2N×(N/2) partition on bottom and a 2N×(3N/2) partition on top. In either case, boundaries 251 and 253 are perpendicular to boundary 252B. Therefore, deblocking decision functions and deblocking filters applied to boundary 252B would be parallel to boundaries 251 and 253. Thus, there is no need to adapt the deblocking decision functions and deblocking filters applied to boundary 252B.

Similarly, pair 250D represents an example where block P may be partitioned using a 2N×nU AMP partitioning scheme (producing boundary 256), or a 2N×nD partitioning scheme (producing boundary 258). As in the case of pair 250B, boundaries 256 and 258 are perpendicular to boundary 252D, and thus, there is no need to adapt the deblocking decision functions and deblocking filters applied to boundary 252D. Likewise, for pair 250E, conventional deblocking decision functions and deblocking filters may be applied to boundary 252E, as boundaries 260, 262, 264, and 266 are perpendicular to boundary 252E. Thus, when both blocks P and Q are partitioned using either 2N×nU or 2N×nD AMP partitioning schemes, adaptation of the deblocking decision functions and deblocking filters applied to vertical boundary 252E is not necessary.

Pair 250C represents an example in which block Q is partitioned using a nL×2N partitioning scheme. In this manner, block Q includes boundary 254. Moreover, boundary 254 runs parallel to boundary 252C, which divides blocks Q and P in the example of pair 250C. Again assuming that blocks P and Q are 16×16 pixel blocks, block Q would include a 4×16 partition on the left and a 12×16 partition on the right. Accordingly, conventional deblocking decision functions and deblocking filters may encounter overlap when applied in parallel to boundaries 252C and 254. Therefore, rather than using conventional deblocking decision functions and deblocking filters, adapted deblocking decision functions and deblocking filters may be applied to boundaries 252C and 254, in accordance with the techniques of this disclosure.

Similarly, for pair 250G, adapted deblocking decision functions and deblocking filters may be applied to boundaries 276 and 252G. In this case, block P represents an example of a block partitioned using an nR×2N AMP partitioning scheme. Thus, assuming that block P has 16×16 pixels, the 4×16 pixel partition of block P touches boundary 252G, as illustrated in FIG. 8. Likewise, for pair 250I, the deblocking decision functions and deblocking filters applied to each of boundaries 280, 252I, and 282 may be adapted to avoid overlap.

In general, the adaptation of the deblocking decision functions and deblocking filters may be uni-directional. For example, only the side of the deblocking decision functions and deblocking filters that extends toward a parallel boundary that would otherwise cause overlap when applied in parallel may be adapted. Thus, for boundary 252C, only the right side of the deblocking decision functions and deblocking filters may be adapted in some examples, while only the left side of the deblocking decision functions and deblocking filters applied to boundary 254 may be adapted in some examples. Likewise, for boundary 252G, only the left side of the deblocking decision functions and deblocking filters may be adapted in some examples, while only the right side of the deblocking decision functions and deblocking filters applied to boundary 276 may be adapted in some examples. With respect to pair 250I, the right side of the deblocking decision functions and deblocking filters applied to boundary 280 may be adapted, the left side of the deblocking decision functions and deblocking filters applied to boundary 282 may be adapted, and both sides of the deblocking decision functions and deblocking filters applied to boundary 252I may be adapted. Alternatively, both sides of the deblocking decision functions and deblocking filters may be adapted in all cases where adaptation is determined to be used.

In the remaining examples of pairs 250F and 250H, one of blocks P and Q is partitioned using either a 2N×nU or 2N×nD AMP partitioning scheme, while the other of the blocks is partitioned using either an nR×2N or nL×2N AMP partitioning scheme. Thus, adaptation of the deblocking decision functions and deblocking filters may be applied to the vertical boundaries, but not to the horizontal boundaries of the blocks partitioned using the 2N×nU or 2N×nD AMP partitioning scheme. For example, adapted deblocking decision functions and deblocking filters may be applied to boundaries 252F and 272 of pair 250F, but conventional deblocking decision functions and deblocking filters may be applied to boundaries 268 and 270. As another example, adapted deblocking decision functions and deblocking filters may be applied to boundaries 252H and 278 of pair 250H, but conventional deblocking decision functions and deblocking filters may be applied to boundaries 277 and 279.

Again, in some examples, for boundary 252F, only the right side of the deblocking decision functions and deblocking filters may be adapted in some examples, while only the left side of the deblocking decision functions and deblocking filters applied to boundary 272 may be adapted in some examples. Likewise, for boundary 252H, only the left side of the deblocking decision functions and deblocking filters may be adapted in some examples, while only the right side of the deblocking decision functions and deblocking filters applied to boundary 276 may be adapted in some examples. Again, alternatively, both sides of these deblocking decision functions and deblocking filters may be adapted.

In this manner, FIG. 8 illustrates AMP cases for left/right neighboring blocks P and Q. Similar cases may be formed for top/bottom P and Q blocks. If one block (P or Q) is a 16×16 CU of the AMP type, while the other block is any other intra/inter type, including 16×16 CU of the AMP type, the deblocking filter of the common edge between blocks P and Q may be adapted when there is at least one adjacent 16×4 or 4×16 AMP partition that is parallel with the edge between blocks P and Q (as in pairs 250C, 250F, 250G, 250H, and 250I). The arrows in FIG. 8 indicate the edges, including the internal AMP partition edge, for which the deblocking filter may be adapted in order to avoid filtering dependencies between nearby edges. In some examples, for pairs 250 of FIG. 8, only the deblocking filter may be adapted as determined per the discussion above, rather than adapting both the deblocking decision functions and the deblocking filters for those edges for which adaptation is indicated.

Figure 9:
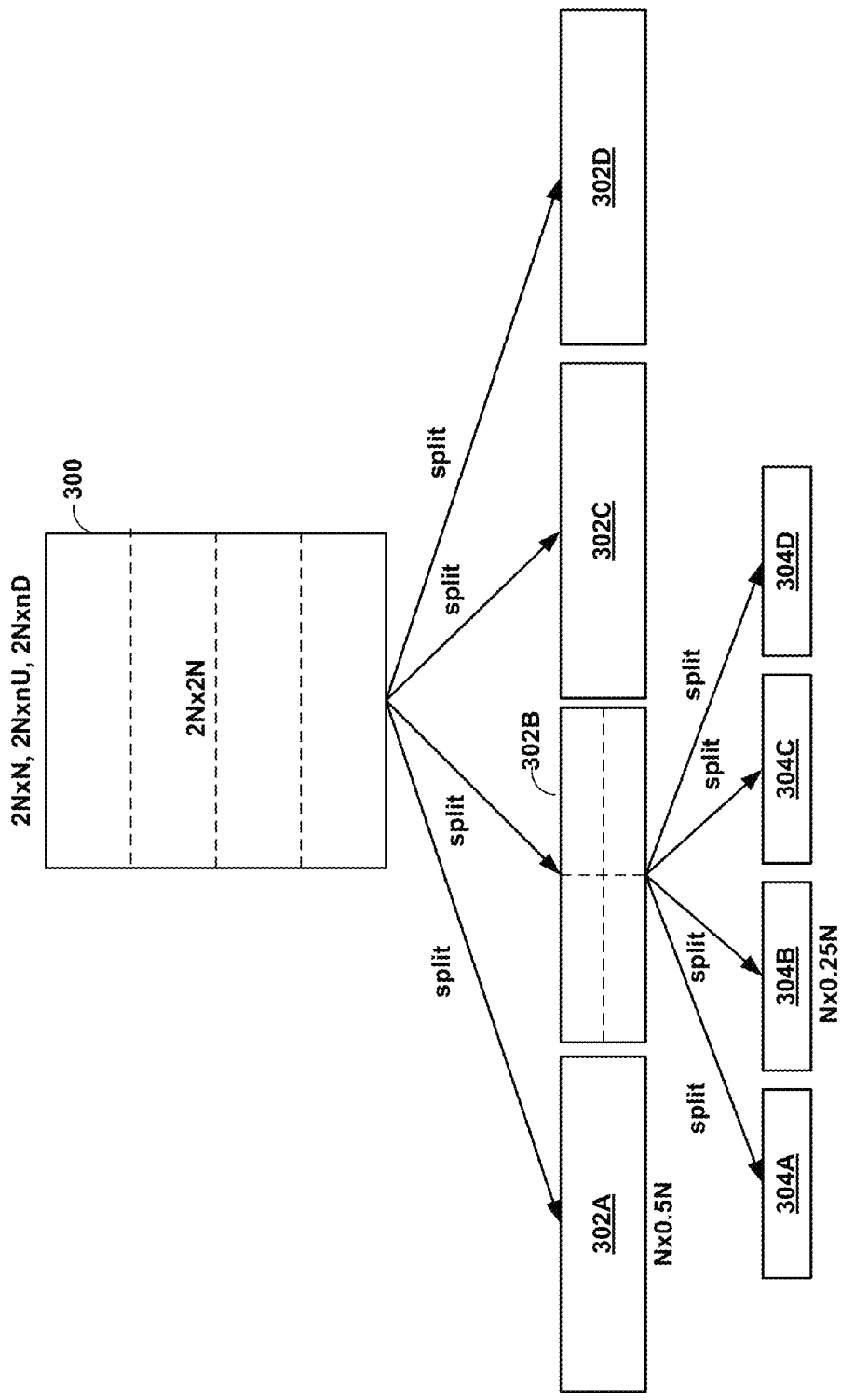
FIG. 9 is a conceptual diagram illustrating an example partitioning structure for non-square quadtree partitioning.

FIG. 9 is a conceptual diagram illustrating an example partitioning structure for non-square quadtree partitioning. As shown in FIG. 9, a block 300 may be partitioned using non-square quadtree transforms (NSQT). Generally, NSQT allows a block, such as a TU of a C,U to be partitioned into a first level of four non-square rectangles, any or all of which may be further partitioned into an additional level of four smaller, equally sized non-square rectangles. In the example of FIG. 9, a block 300 has size 2N×2N. The block may be partitioned into four 2N×(N/2) or (N/2)×2N rectangles 302A-302D. Any or all of these first level blocks 302 may be further partitioned into a second level of four smaller equally sized non-square blocks 304A-304D (blocks 304) having size N×(N/4) or (N/4)×N. Although block 300 is illustrated in FIG. 9 as being partitioned into two levels of sub-blocks (302, 304), a block, such as block 300 may be partitioned into one level of blocks, which is not further partitioned. NSQT is generally used for partitioning transform units (TUs) of a block, where TUs include transform coefficients associated with residual data. The techniques of this disclosure may be applied to deblock boundaries resulting from NSQT partitions, such as those illustrated in FIG. 9.

In some examples, a de-blocker may apply adapted deblocking decision functions and/or deblocking filters to one or more edges of the NSQT-partitioned blocks depicted in FIG. 9. As with the blocks illustrated in FIG. 8 above, a de-blocker, such as de-blocker 90 of FIG. 4, may apply an adapted deblocking decision function and/or deblocking filter when deblocking two edges may result in an overlap of support for the filter or the decision function. Typically, an overlap of support may occur when two edges are closer together than 8 pixels. When two edges are perpendicular to one another, de-blocker 90 may apply a standard decision function and/or deblocking filter to the edges. When NSQT partitioning produces two parallel edges that are located closer than 8 pixels to each other, de-blocker 90 may adapt the decision function and/or deblocking filter in accordance with the techniques of this disclosure.

Figure 10:
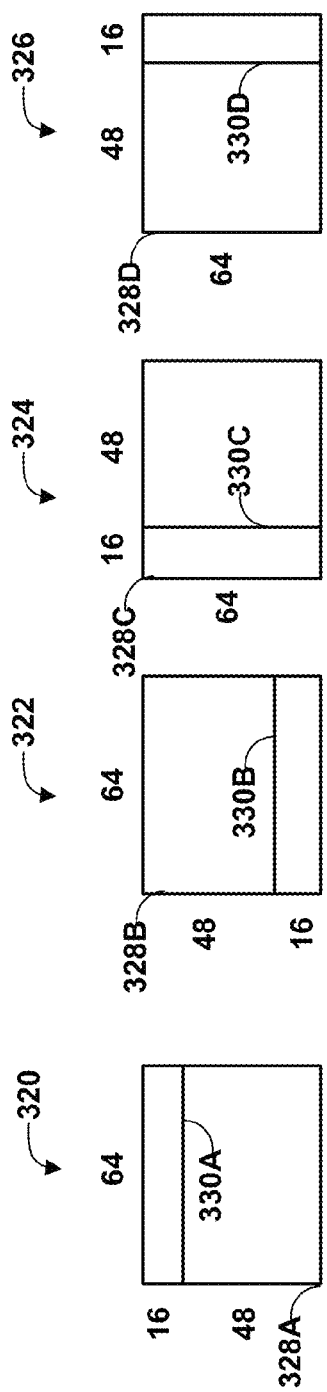
FIG. 10 is a conceptual diagram illustrating various examples of asymmetric motion partitioning (AMP) partitioned blocks.

FIG. 10 is a conceptual diagram illustrating various examples of AMP-partitioned blocks 320-326. AMP partitioning generally involves partitioning a block, such as a PU into two or more smaller blocks. In an AMP partitioning scheme, a block of size 2N×2N may be partitioned either vertically or horizontally into two rectangles. In the example of FIG. 10, each block 320, 322, 324, and 326, is partitioned into two rectangles. One rectangle has a dimension (that is, length or width) of N/2 pixels, and another rectangle has the same dimension of 3N/2 pixels.

In this example, each of the blocks 320, 322, 324, and 326, is a 64×64 pixel block, although other sizes of blocks may also be partitioned in a similar manner. Block 320 includes a left edge 328A, and is partitioned using a 2N×nU AMP partitioning scheme, such that block 320 includes a 64×16 partition on top and a 64×48 partition on bottom, divided by edge 330A. Block 322 includes a left edge 328B, and is partitioned using a 2N×nD AMP partitioning scheme, such that block 322 includes a 64×16 partition on bottom and a 64×48 partition on top, divided by edge 330B. Block 324 includes a left edge 328D, and is partitioned using an nL×2N AMP partitioning scheme, such that block 324 includes a 16×64 partition on the left and a 48×64 partition on the right, divided by edge 330C. Block 326 is partitioned using an nR×2N AMP partitioning scheme, such that block 326 includes a 16×64 partition on the right and a 48×64 partition on the left, divided by edge 330D. Depending on the location of the AMP boundary within blocks 320-326 and the location of a boundary between blocks 320-326 and a neighboring block, adapted deblocking decision functions and/or adapted deblocking filters may be applied to any or all of the internal AMP boundaries and boundaries between blocks 320-326 and the neighboring blocks.

In some examples, a video coding device, such as a video encoder or a video decoder may apply adapted deblocking decision functions and/or adapted deblocking filters to one or more of the blocks illustrated in FIG. 10. De-blocker 90 of FIG. 4 may attempt to de-block edge 328A of block 320. In the case of block 320, edge 330A is perpendicular to edge 328A so de-blocker 90 may apply the standard deblocking filter from the current version of HM to block 320. De-blocker 90 may similarly apply the standard HM deblocking filter to edge 238B of block 322 because edge 330B is perpendicular to edge 328B. In the cases of blocks 324 and 326, de-blocker 90 may still be able to apply the standard HM deblocking filter despite the fact that both blocks have an edge parallel to another edge. In the case of block 324, edge 328C is 16 pixels from edge 328C. The Standard HM filter has 8×8 pixel support, utilizing a 4×8 pixel region of support on either side of the edge to be de-blocked. When deblocking edge 328C, de-blocker 90 may use four pixels on either side of edge 328C for support. If edge 330C is being de-blocked in parallel with edge 328C, only four pixels to the left and right of edge 330C are used for support. Thus, when deblocking edges 328C and 330C, no overlap would occur. Similarly, in the case of deblocking edge 328D, no deblocking would occur, as the distance between edge 328D and edge 330D is even greater.

FIGS. 11A-11I are conceptual diagrams illustrating various SDIP PU orientations relative to an edge between two blocks. Although examples of side-by-side blocks are shown, it should be understood that similar techniques may be applied with respect to top-bottom neighboring blocks. FIG. 11A depicts blocks 340, 342 having edge 341. In this example, blocks 340 and 340 are predicted using prediction modes other than SDIP. Therefore, edge 341 may be processed for deblocking normally (that is, without further consideration or adaptation due to SDIP prediction).

FIG. 11B depicts blocks 344, 346 having edge 345. In this example, block 344 is predicted using a prediction mode other than SDIP. Although block 346 is predicted using SDIP, the SDIP PUs of 346 are perpendicular to edge 345, in this example. Therefore, lines of support (which are generally perpendicular to edge 345 will be parallel to the edges between the SDIP PUs of block 346. Accordingly, edge 345 may be processed for deblocking normally as well. Similarly, for FIG. 11D, in which blocks 352 and 354 have edge 353, block 352 is SDIP predicted using SDIP PUs that are perpendicular to edge 353, and thus, edge 353 may be processed for deblocking normally. Likewise, for FIG. 11E, in which blocks 366 and 368 have edge 367, both blocks 366 and 368 are predicted using SDIP PUs that are perpendicular to edge 367, and thus, edge 367 may be processed for deblocking normally as well.

FIG. 11C depicts blocks 348 and 350 having edge 349. In this case, depending on the width of the SDIP PUs of block 350, a region of support may cross PU boundaries between SDIP PUs of block 350. Accordingly, processing of edge 349 for deblocking may include utilizing adapted deblocking decision functions, support, and/or deblocking filters. The adaptations may be performed to avoid crossing SDIP PU boundaries of block 350 when processing edge 349 for deblocking. Similarly, adapted decision functions and deblocking filters may be used when processing edge 375 of FIG. 11G, formed between blocks 374 and 376, as block 374 is predicted using SDIP PUs that are parallel to edge 375. In the case of FIG. 11I, blocks 382 and 384, which have edge 383, are both predicted using SDIP PUs that are parallel to edge 383. Accordingly, the adaptation of the decision functions and support may avoid crossing SDIP PU boundaries in both blocks 382 and 384.

Likewise, adapted sets of support, decision functions, and/or deblocking filters may be applied to edge 371 formed between blocks 370 and 372 of FIG. 11F and edge 379 formed between blocks 378 and 380 of FIG. 11H. Although blocks 370 and 380 are predicted using SDIP PUs, these SDIP PUs are perpendicular to edge 371 and edge 379, respectively. Therefore, the adapted support, functions, and filters need not account for edges in blocks 370 and 380. However, because blocks 372 and 378 are predicted using SDIP PUs that are parallel to edges 371 and 379, respectively, adapted support, functions, and filters may be selected to avoid crossing SDIP PU boundaries in blocks 372 and 378.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:
1. A method of coding video data, the method comprising:
  decoding a first block of video data and a second block of video data, wherein the first block and the second block share a common edge, wherein decoding the first block and the second block comprises reconstructing a first residual block for the first block and a second residual block for the second block;
  obtaining information indicating that at least one of the first block or the second block is non-square, wherein the information indicates that at least one of the first block or the second block comprises an asymmetric motion partition or a non-square transform; and determining whether to deblock the common edge between the first block and the second block based at least in part on whether at least one of the first block or the second block is non-square and based on application of an adapted deblocking decision function or a conventional deblocking decision function to pixels of the first block and the second block after determining that the at least one of the first block or the second block is non-square, wherein the adapted deblocking decision function or the conventional deblocking decision function comprises a plurality of coefficients.

2. The method of claim 1, wherein the method further comprises, prior to decoding, encoding the first block and the second block.

3. The method of claim 1,
wherein obtaining the information comprises obtaining information indicating that the first block comprises an asymmetric motion partition of a parent block, the method further comprising:
determining that the first block is non-square based on the obtained information indicating that the first block comprises the asymmetric motion partition.

4. The method of claim 3, further comprising partitioning the parent block using asymmetric motion partitioning to form the first block, wherein obtaining the information comprises producing the information by a video encoder and receiving the information by a deblocking filter of the video encoder.

5. The method of claim 3, wherein obtaining the information comprises obtaining the information by a video decoder as syntax information for an encoded bitstream comprising the first block and the second block.

6. The method of claim 3, further comprising:
obtaining information indicating that the second block comprises a second asymmetric motion partition of a second, different parent block; and
determining that the second block is non-square based on the obtained information indicating that the second block comprises the second asymmetric motion partition.

7. The method of claim 1,
wherein obtaining the information comprises obtaining information indicating that the first block comprises a non-square transform for a symmetric motion partition of a parent block, the method further comprising:
determining that the first block is non-square based on the obtained information indicating that the first block comprises the non-square transform for the symmetric motion partition of the parent block.

8. The method of claim 7, further comprising partitioning the parent block into non-square symmetric partitions using symmetric motion partitioning to form the first block, wherein the first block comprises one of the symmetric, non-square partitions of the parent block, wherein obtaining the information comprises producing the information by a video encoder and receiving the information by a deblocking filter of the video encoder.

9. The method of claim 7, wherein obtaining the information comprises obtaining the information by a video decoder as syntax information for an encoded bitstream comprising the first block and the second block.

10. The method of claim 1, wherein determining whether to deblock the common edge comprises:
determining whether at least one of the first block or the second block is non-square; and applying the adapted deblocking decision function to pixels of the first block and the second block after determining that at least one of the first block or the second block is non-square.

11. The method of claim 1, wherein determining whether to deblock the common edge comprises:
determining whether at least one of the first block or the second block is non-square;
determining, after determining that the first block is non-square, whether a narrow portion of the first block is perpendicular to the common edge;
determining, after determining that the second block is non-square, whether a narrow portion of the second block is perpendicular to the common edge;
applying a first adapted deblocking decision function to pixels of the first block and the second block when the first block is non-square and when the narrow portion of the first block is not perpendicular to the common edge;
applying a second adapted deblocking decision function to pixels of the first block and the second block when the second block is non-square and when the narrow portion of the second block is not perpendicular to the common edge;
applying a third adapted deblocking decision function to pixels of the first block and the second block when the first block is non-square and when the narrow portion of the first block is not perpendicular to the common edge and when the second block is non-square and when the narrow portion of the second block is not perpendicular to the common edge; and
applying a conventional deblocking decision function to pixels of the first block and the second block when the first block is either square or the narrow portion of the first block is perpendicular to the common edge and when the second block is either square or the narrow portion of the second block is perpendicular to the common edge.

12. The method of claim 11, further comprising applying the adapted deblocking filter to the common edge when at least one of the first adapted deblocking decision function, the second adapted deblocking decision function, or the third deblocking decision function indicates that the common edge is to be deblocked.

13. The method of claim 11, wherein the common edge comprises a length of eight pixels, and wherein applying the third adapted deblocking decision function to the pixels of the first block and the second block comprises:
applying the third adapted deblocking decision function to a first set of pixels perpendicular to the common edge at a first location two pixels from an end of the common edge; and
applying the third adapted deblocking decision function to a second, different set of pixels perpendicular to the common edge at a second location five pixels from the end of the common edge.

14. The method of claim 13, further comprising, after determining that the third adapted deblocking decision function indicates that the common edge should be deblocked, deblocking the common edge using a deblocking filter comprising:

$$\Delta = (9*(q0-p0) - 3*(q1-p1) + 8)/16,$$

$$\Delta = \text{Clip}(-tc, tc, \Delta),$$

wherein tc is an HM deblocking threshold that depends on a quantization parameter (QP) for at least one of the first or second blocks, $$p0' = p0 + \Delta, \text{ and}$$

$$q0' = q0 - \Delta.$$

15. The method of claim 13, further comprising, after determining that the third adapted deblocking decision function indicates that the common edge should be deblocked, deblocking the common edge using a deblocking filter comprising:

$$\Delta=(9*(q0-p0)-3*(q1-p1)+8)/16,$$

$$\Delta=\text{Clip}(-tc,tc,\Delta),$$

wherein tc is an HM deblocking threshold that depends on a quantization parameter (QP) for at least one of the first or second blocks, $$p0'=p0+\Delta,$$

$$q0'=q0-\Delta,$$

$$p1'=p1+\Delta/2, \text{ and}$$

$$q1'=q1-\Delta/2.$$

16. An apparatus for coding video data, the apparatus comprising a video coding device configured to decode a first block of video data and a second block of video data, wherein the first block and the second block share a common edge, and wherein to decode the first block and the second block, the video coding device is configured to reconstruct a first residual block for the first block and a second residual block for the second block, obtain information indicating that at least one of the first block or the second block is non-square, wherein the information indicates that at least one of the first block or the second block comprises an asymmetric motion partition or a non-square transform, and determine whether to deblock the common edge between the first block and the second block based at least in part on whether at least one of the first block or the second block is non-square and based on application of an adapted deblockinq decision function or a conventional deblockinq decision function to pixels of the first block and the second block after determining that the at least one of the first block or the second block is non-square, wherein the adapted deblockinq decision function or the conventional deblockinq decision function comprises a plurality of coefficients.

17. The apparatus of claim 16, wherein the apparatus comprises at least one of:
an integrated circuit;
a microprocessor; or
a wireless communication device that includes the video coding device.

18. The apparatus of claim 16, wherein the video coding device is further configured to, prior to decoding, encode the first block and the second block.

19. The apparatus of claim 16, wherein the video coding device is further configured to obtain information indicating that the first block comprises an asymmetric motion partition of a parent block and determine that the first block is non-square based on the obtained information indicating that the first block comprises the asymmetric motion partition.

20. The apparatus of claim 19, wherein to obtain the information, the video coding device is further configured to obtain the information by a video decoder as syntax information for an encoded bitstream comprising the first block and the second block.

21. The apparatus of claim 19, wherein the video coding device is further configured to obtain information indicating that the second block comprises a second asymmetric motion partition of a second, different parent block and determine that the second block is non-square based on the obtained information indicating that the second block comprises the second asymmetric motion partition.

22. The apparatus of claim 16, wherein the video coding device is further configured to obtain information indicating that the first block comprises a non-square transform for a symmetric motion partition of a parent block and determine that the first block is non-square based on the obtained information indicating that the first block comprises the non-square transform for the symmetric motion partition of the parent block.

23. The apparatus of claim 22, wherein to obtain the information, the video coding device is further configured to obtain the information by a video decoder as syntax information for an encoded bitstream comprising the first block and the second block.

24. The apparatus of claim 16, wherein to determine whether to deblock the common edge, the video coding device is further configured to determine whether at least one of the first block or the second block is non-square and apply the adapted deblocking decision function to pixels of the first block and the second block after determining that at least one of the first block or the second block is non-square.

25. The apparatus of claim 16, wherein to determine whether to deblock the common edge, the video decoder is configured to determine whether at least one of the first block or the second block is non-square, determine, after determining that the first block is non-square, whether a narrow portion of the first block is perpendicular to the common edge, determine, after determining that the second block is non-square, whether a narrow portion of the second block is perpendicular to the common edge, apply a first adapted deblocking decision function to pixels of the first block and the second block when the first block is non-square and when the narrow portion of the first block is not perpendicular to the common edge, apply a second adapted deblocking decision function to pixels of the first block and the second block when the second block is non-square and when the narrow portion of the second block is not perpendicular to the common edge, apply a third adapted deblocking decision function to pixels of the first block and the second block when the first block is non-square and when the narrow portion of the first block is not perpendicular to the common edge and when the second block is non-square and when the narrow portion of the second block is not perpendicular to the common edge, and apply a conventional deblocking decision function to pixels of the first block and the second block when the first block is either square or the narrow portion of the first block is perpendicular to the common edge and when the second block is either square or the narrow portion of the second block is perpendicular to the common edge.

26. The apparatus of claim 25, wherein the common edge comprises a length of eight pixels, and wherein to apply the third adapted deblocking decision function to the pixels of the first block and the second block, the video decoder is further configured to apply the third adapted deblocking decision function to a first set of pixels perpendicular to the common edge at a first location two pixels from an end of the common edge, wherein the device is further configured to apply the third adapted deblocking decision function to a second, different set of pixels perpendicular to the common edge at a second location five pixels from the end of the common edge.

27. The apparatus of claim 26, wherein the video coding device is further configured to, after determining that the third adapted deblocking decision function indicates that the common edge should be deblocked, deblock the common edge using a deblocking filter comprising:

$$\Delta=(9*(q0-p0)-3*(q1-p1)+8)/16,$$

$$\Delta=\text{Clip}(-tc,tc,\Delta),$$

wherein tc is an HM deblocking threshold that depends on a quantization parameter (QP) for at least one of the first or second blocks, $p0'=p0+\Delta$, and $q0'=q0-\Delta$.

28. The apparatus of claim 27, wherein the apparatus is further configured to, after determining that the third adapted deblocking decision function indicates that the common edge should be deblocked, deblock the common edge using a deblocking filter comprising:

$\Delta=(9*(q0-p0)-3*(q1-p1)+8)/16$, $\Delta=\text{Clip}(-tc,tc,\Delta)$, wherein tc is an HM deblocking threshold that depends on a quantization parameter (QP) for at least one of the first or second blocks, $p0'=p0+\Delta$, $q0'=q0-\Delta$, $p1'=p1+\Delta/2$, and $q1'=q1-\Delta/2$.

29. An apparatus for coding video data, the apparatus comprising: means for decoding a first block of video data and a second block of video data, wherein the first block and the second block share a common edge, wherein the means for decoding the first block and the second block comprises means for reconstructing a first residual block for the first block and a second residual block for the second block;
   means for obtaining information indicating that at least one of the first block or the second block is non-square, wherein the information indicates that at least one of the first block or the second block comprises an asymmetric motion partition or a non-square transform; and
   means for determining whether to deblock the common edge between the first block and the second block based at least in part on whether at least one of the first block or the second block is non-square and based on application of an adapted deblockinq decision function or a conventional deblockinq decision function to pixels of the first block and the second block after determining that the at least one of the first block or the second block is non-square, wherein the adapted deblockinq decision function or the conventional deblockinq decision function comprises a plurality of coefficients.

30. The apparatus of claim 29, wherein the apparatus is further configured to, prior to decoding, encode the first block and the second block.

31. The apparatus of claim 29,
   wherein the means for obtaining the information comprises means for obtaining information indicating that the first block comprises an asymmetric motion partition of a parent block, the apparatus further comprising:
   means for determining that the first block is non-square based on the obtained information indicating that the first block comprises the asymmetric motion partition.

32. The apparatus of claim 31, wherein the means for obtaining the information comprises means for obtaining the information by a video decoder as syntax information for an encoded bitstream comprising the first block and the second block.

33. The apparatus of claim 31, wherein the apparatus further comprises:
   means for obtaining information indicating that the second block comprises a second asymmetric motion partition of a second, different parent block; and
   means for determining that the second block is non-square based on the obtained information indicating that the second block comprises the second asymmetric motion partition.

34. The apparatus of claim 29,
   wherein the means for obtaining the information comprises means for obtaining information indicating that the first block comprises a non-square transform for a symmetric motion partition of a parent block, the apparatus further comprising:
   means for determining that the first block is non-square based on the obtained information indicating that the first block comprises the non-square transform for the symmetric motion partition of the parent block.

35. The apparatus of claim 34, wherein the means for obtaining the information comprises means for obtaining the information by a video decoder as syntax information for an encoded bitstream comprising the first block and the second block.

36. The apparatus of claim 29, wherein the apparatus further comprises:
   means for determining whether at least one of the first block or the second block is non-square; and
   means for applying the adapted deblocking decision function to pixels of the first block and the second block after determining that at least one of the first block or the second block is non-square.

37. The apparatus of claim 29, wherein the means for determining whether to deblock the common edge comprises means for determining whether at least one of the first block or the second block is non-square;
   wherein the apparatus further comprises:
   means for determining, after determining that the first block is non-square, whether a narrow portion of the first block is perpendicular to the common edge;
   means for determining, after determining that the second block is non-square, whether a narrow portion of the second block is perpendicular to the common edge;
   means for applying a first adapted deblocking decision function to pixels of the first block and the second block when the first block is non-square and when the narrow portion of the first block is not perpendicular to the common edge;
   means for applying a second adapted deblocking decision function to pixels of the first block and the second block when the second block is non-square and when the narrow portion of the second block is not perpendicular to the common edge;
   means for applying a third adapted deblocking decision function to pixels of the first block and the second block when the first block is non-square and when the narrow portion of the first block is not perpendicular to the common edge and when the second block is non-square and when the narrow portion of the second block is not perpendicular to the common edge; and
   means for applying a conventional deblocking decision function to pixels of the first block and the second block when the first block is either square or the narrow portion of the first block is perpendicular to the common edge and when the second block is either square or the narrow portion of the second block is perpendicular to the common edge.

38. The apparatus of claim 37, wherein the common edge comprises a length of eight pixels;
  wherein the means for applying the third adapted deblocking decision function to the pixels of the first block and the second block comprises means for applying the third adapted deblocking decision function to a first set of pixels perpendicular to the common edge at a first location two pixels from an end of the common edge; and
  wherein the apparatus further comprises means for applying the third adapted deblocking decision function to a second, different set of pixels perpendicular to the common edge at a second location five pixels from the end of the common edge.

39. The apparatus of claim 38, wherein the apparatus further comprises:
  means for deblocking, after determining that the third adapted deblocking decision function indicates that the common edge should be deblocked, the common edge using a deblocking filter comprising:

$\Delta=(9*(q0-p0)-3*(q1-p1)+8)/16$, $\Delta=\text{Clip}(-tc,tc,\Delta)$, wherein tc is an HM deblocking threshold that depends on a quantization parameter (QP) for at least one of the first or second blocks, $p0'=p0+\Delta$, and $q0'=q0-\Delta$.

40. The apparatus of claim 38, wherein the apparatus further comprises:
  means for deblocking, after determining that the third adapted deblocking decision function indicates that the common edge should be deblocked, the common edge using a deblocking filter comprising:

$\Delta=(9*(q0-p0)-3*(q1-p1)+8)/16$, $\Delta=\text{Clip}(-tc,tc,\Delta)$, wherein tc is an HM deblocking threshold that depends on a quantization parameter (QP) for at least one of the first and second blocks, $p0'=p0+\Delta$, $q0'=q0-\Delta$, $p1'=p1+\Delta/2$, and $q1'=q1-\Delta/2$.

41. A computer program product comprising a non-transitory computer-readable storage medium having stored thereon instructions that, when executed, cause a processor of a device for coding video data to:
  decode a first block of video data and a second block of video data, wherein the first block and the second block share a common edge, wherein the instructions that cause the processor to decode the first block and the second block comprise instructions that cause the processor to reconstruct a first residual block for the first block and a second residual block for the second block;
  obtain information indicating that at least one of the first block or the second block is non-square, wherein the information indicates that at least one of the first block or the second block comprises an asymmetric motion partition or a non-square transform; and
  determine whether to deblock the common edge between the first block and the second block based at least in part on whether at least one of the first block or the second block is non-square and based on application of an adapted deblocking decision function or a conventional deblocking decision function to pixels of the first block and the second block after determining that the at least one of the first block or the second block is non-square, wherein the adapted deblocking decision function or the conventional deblocking decision function comprises a plurality of coefficients.

42. The computer program product of claim 41, wherein the computer-readable medium further comprises instructions that cause the processor to, prior to decoding, encode the first block and the second block.

43. The computer program product of claim 41,
  wherein the instructions that cause the processor to obtain information comprise instructions that cause the processor to obtain information indicating that the first block comprises an asymmetric motion partition of a parent block, further comprising instructions that cause the processor to:
  determine that the first block is non-square based on the obtained information indicating that the first block comprises the asymmetric motion partition.

44. The computer program product of claim 43, wherein the instructions that cause the processor to obtain the information comprise instructions that cause the processor to obtain the information as syntax information for an encoded bitstream comprising the first block and the second block.

45. The computer program product of claim 43, further comprising instructions that cause the processor to:
  obtain information indicating that the second block comprises a second asymmetric motion partition of a second, different parent block; and
  determine that the second block is non-square based on the obtained information indicating that the second block comprises the second asymmetric motion partition.

46. The computer program product of claim 41,
  wherein the instructions that cause the processor to obtain the information comprise instructions that cause the processor to obtain information indicating that the first block comprises a non-square transform for a symmetric motion partition of a parent block, further comprising instructions that cause the processor to:
  determine that the first block is non-square based on the obtained information indicating that the first block comprises the non-square transform for the symmetric motion partition of the parent block.

47. The computer program product of claim 46, wherein the instructions that cause the processor to obtain the information comprise instructions that cause the processor to obtain the information as syntax information for an encoded bitstream comprising the first block and the second block.

48. The computer program product of claim 41, wherein the instructions that cause the processor to determine whether to deblock the common edge further cause the processor to:
  determine whether at least one of the first block or the second block is non-square;
  and apply the adapted deblocking decision function to pixels of the first block and the second block after determining that at least one of the first block or the second block is non-square.

49. The computer program product of claim 41, wherein the instructions that cause the processor to determine whether to deblock the common edge further cause the processor to:
  determine whether at least one of the first block or the second block is non-square;

wherein the computer program product further comprises instructions that cause the processor to:
determine, after determining that the first block is non-square, whether a narrow portion of the first block is perpendicular to the common edge;
determine, after determining that the second block is non-square, whether a narrow portion of the second block is perpendicular to the common edge;
apply a first adapted deblocking decision function to pixels of the first block and the second block when the first block is non-square and when the narrow portion of the first block is not perpendicular to the common edge;
apply a second adapted deblocking decision function to pixels of the first block and the second block when the second block is non-square and when the narrow portion of the second block is not perpendicular to the common edge;
apply a third adapted deblocking decision function to pixels of the first block and the second block when the first block is non-square and when the narrow portion of the first block is not perpendicular to the common edge and when the second block is non-square and when the narrow portion of the second block is not perpendicular to the common edge; and
apply a conventional deblocking decision function to pixels of the first block and the second block when the first block is either square or the narrow portion of the first block is perpendicular to the common edge and when the second block is either square or the narrow portion of the second block is perpendicular to the common edge.

50. The computer program product of claim 49, wherein the common edge comprises a length of eight pixels;
wherein the instructions that cause the processor to apply the third adapted deblocking decision function to the pixels of the first block and the second block further cause the processor to:
apply the third adapted deblocking decision function to a first set of pixels perpendicular to the common edge at a first location two pixels from an end of the common edge; and
wherein the computer program product further comprises instructions cause the processor to apply the third adapted deblocking decision function to a second, different set of pixels perpendicular to the common edge at a second location five pixels from the end of the common edge.

51. The computer program product of claim 50, wherein the instructions further cause the processor to:
after determining that the third adapted deblocking decision function indicates that the common edge should be deblocked, deblock the common edge using a deblocking filter comprising:

$$\Delta = (9*(q0-p0) - 3*(q1-p1) + 8)/16,$$

$$\Delta = \text{Clip}(-tc, tc, \Delta),$$

wherein tc is an HM deblocking threshold that depends on a quantization parameter (QP) for at least one of the first or second blocks, $$p0' = p0 + \Delta, \text{ and}$$

$$q0' = q0 - \Delta.$$

52. The computer program product of claim 50, wherein the instructions further cause the processor to:
after determining that the third adapted deblocking decision function indicates that the common edge should be deblocked, deblock the common edge using a deblocking filter comprising:

$$\Delta = (9*(q0-p0) - 3*(q1-p1) + 8)/16,$$

$$\Delta = \text{Clip}(-tc, tc, \Delta),$$

wherein tc is an HM deblocking threshold that depends on a quantization parameter (QP) for at least one of the first or second blocks, $$p0' = p0 + \Delta,$$

$$q0' = q0 - \Delta,$$

$$p1' = p1 + \Delta/2, \text{ and}$$

$$q1' = q1 - \Delta/2.$$

* * * * *